(12) United States Patent
Ramos et al.

(10) Patent No.: US 6,179,890 B1
(45) Date of Patent: Jan. 30, 2001

(54) AIR CLEANER HAVING SEALING ARRANGEMENT BETWEEN MEDIA ARRANGEMENT AND HOUSING

(75) Inventors: Timothy M. Ramos, Burnsville; Edward A. Steinbrueck, Eden Prairie; Steven Scott Gieseke, Richfield; Carolyn J. Finnerty, Bloomington; Wayne R. W. Bishop, St. Louis Park, all of MN (US)

(73) Assignee: Donaldson Company, Inc., Minneapolis, MN (US)

( * ) Notice: Under 35 U.S.C. 154(b), the term of this patent shall be extended for 0 days.

(21) Appl. No.: 09/258,412

(22) Filed: Feb. 26, 1999

(51) Int. Cl.⁷ .............................. B01D 29/56; B01D 35/30
(52) U.S. Cl. ................................ 55/482; 55/486; 55/502; 55/503; 55/521
(58) Field of Search .................................. 55/482, 385.3, 55/486, 502, 503, 521

(56) References Cited

U.S. PATENT DOCUMENTS

| | | |
|---|---|---|
| D. 416,308 | 11/1999 | Ward et al. . |
| 3,019,854 | 2/1962 | O'Bryant . |
| 3,025,963 | 3/1962 | Bauer . |
| 3,209,917 | 10/1965 | Yelinek . |
| 3,442,067 * | 5/1969 | Swenson .............................. 55/482 |
| 3,676,242 | 7/1972 | Prentice . |
| 3,740,933 | 6/1973 | Hollowell . |
| 3,807,150 | 4/1974 | Maracle . |
| 3,841,953 | 10/1974 | Lohkamp et al. . |
| 3,849,241 | 11/1974 | Butin et al. . |
| 3,878,014 | 4/1975 | Melead . |
| 3,912,631 | 10/1975 | Turman . |
| 4,065,341 | 12/1977 | Cub . |
| 4,310,419 | 1/1982 | Nara et al. . |
| 4,322,231 | 3/1982 | Hilzendeger et al. . |
| 4,402,830 | 9/1983 | Pall . |
| 4,449,993 | 5/1984 | Bergeron . |
| 4,578,091 * | 3/1986 | Borja ...................................... 55/486 |
| 4,720,292 | 1/1988 | Engel et al. . |
| 4,759,783 | 7/1988 | Machado . |
| 4,824,564 | 4/1989 | Edwards et al. . |
| 4,925,561 | 5/1990 | Ishii et al. . |
| 4,999,038 | 3/1991 | Lundberg . |
| 5,049,326 | 9/1991 | Matsumoto et al. . |
| 5,174,895 | 12/1992 | Drori . |
| 5,238,474 | 8/1993 | Kahlbaugh et al. . |
| 5,304,312 | 4/1994 | Forster et al. . |

(List continued on next page.)

FOREIGN PATENT DOCUMENTS

| | | |
|---|---|---|
| 997684 | 9/1976 | (CA) . |
| 2155522 | 5/1973 | (DE) . |
| 0 738 528 A2 | 10/1996 | (EP) . |
| WO 88/03431 | 5/1988 | (WO) . |
| WO 99/47237 | 9/1999 | (WO) . |

* cited by examiner

Primary Examiner—David A. Simmons
Assistant Examiner—Robert A. Hopkins
(74) Attorney, Agent, or Firm—Merchant & Gould P.C.

(57) ABSTRACT

An air cleaner includes a housing having first and second opposite ends. A media pack is preferably oriented within the interior volume of the housing. In preferred embodiments, the media pack will have a first and second opposite flow face and be constructed and arranged for air to flow into the media pack through the first flow face, and for air to exit the media pack through the second flow face. The air cleaner will include a seal member forming a seal between the media pack and the housing. In preferred constructions, a secondary filter element is oriented within the interior volume of the housing. In some preferred embodiments, the housing is constructed and arranged as a resonator. Certain embodiments include a seal construction that engages the secondary filter element. Methods of filtering systems, servicing filtration systems, and constructing filter arrangements and housings will use filter elements and constructions as characterized above.

27 Claims, 10 Drawing Sheets

U.S. PATENT DOCUMENTS

| | | |
|---|---|---|
| 5,350,515 | 9/1994 | Stark et al. . |
| 5,415,677 | 5/1995 | Ager et al. . |
| 5,435,870 | 7/1995 | Takagaki et al. . |
| 5,484,466 | 1/1996 | Brown et al. . |
| 5,487,767 | 1/1996 | Brown . |
| 5,543,007 | 8/1996 | Takagaki et al. . |
| 5,547,480 | 8/1996 | Coulonvaux . |
| 5,582,146 * | 12/1996 | Linsbauer et al. ............ 55/485 |
| 5,613,992 | 3/1997 | Engel . |
| 5,672,399 | 9/1997 | Kahlbaugh et al. . |
| 5,685,985 | 11/1997 | Brown et al. . |
| 5,714,126 | 2/1998 | Frund . |
| 5,730,766 | 3/1998 | Clements . |
| 5,755,843 * | 5/1998 | Sundquist ............ 55/385.03 |
| 5,792,247 | 8/1998 | Gillingham et al. . |
| 5,800,587 | 9/1998 | Kahlbaugh et al. . |
| 5,820,646 | 10/1998 | Gillingham et al. . |
| 5,863,313 | 1/1999 | Coulonvaux . |
| 5,895,574 | 4/1999 | Friedmann et al. . |
| 5,897,676 | 4/1999 | Engel et al. . |
| 5,908,480 * | 6/1999 | Ban et al. ................ 55/482 |
| B1 4,720,292 | 9/1991 | Engel et al. . |

AIR CLEANER HAVING SEALING ARRANGEMENT BETWEEN MEDIA ARRANGEMENT AND HOUSING

FIELD OF THE INVENTION

This disclosure describes air cleaners for engines and methods. In particular, this disclosure describes an air cleaner having a straight-through flow, sealing system, resonator, and methods for servicing and use.

BACKGROUND OF THE INVENTION

Gas streams often carry particulate material therein. In many instances, it is desirable to remove some or all of the particulate material from a gas flow stream. For example, air intake streams to engines for motorized vehicles or other motorized equipment often include particulate material therein. The particulate material, should it reach the internal workings of the various mechanisms involved, can cause substantial damage thereto. It is therefore preferred, for such systems, to remove the particulate material from the gas flow upstream of the engine or other equipment involved. A variety of air filter or gas filter arrangements have been developed for particulate removal. In general, however, continued improvements are sought.

SUMMARY OF THE DISCLOSURE

This disclosure concerns, in one embodiment, an air cleaner including a housing having first and second opposite ends. Preferably, the housing defines an inlet adjacent to the first end and an outlet adjacent to the second end. A media pack is preferably oriented within the interior volume of the housing. In preferred embodiments, the media pack will have a first and second opposite flow face and be constructed and arranged for air to flow into the media pack through the first flow face, and for air to exit the media pack through the second flow face. The air cleaner will include a seal member forming a seal between the media pack and the housing. In preferred constructions, a secondary filter element is oriented within the interior volume of the housing.

In some preferred embodiments, the housing is constructed and arranged as a resonator.

Certain preferred embodiments will include seal constructions that engage the secondary filter element to help hold the secondary filter element axially within the housing.

Methods of filtering systems, servicing filtration systems, and constructing filter arrangements and housings are described herein. Preferred methods will use filter elements and constructions as characterized above.

DETAILED DESCRIPTION

A. Systems of Use, FIG. 4

Figure 4:
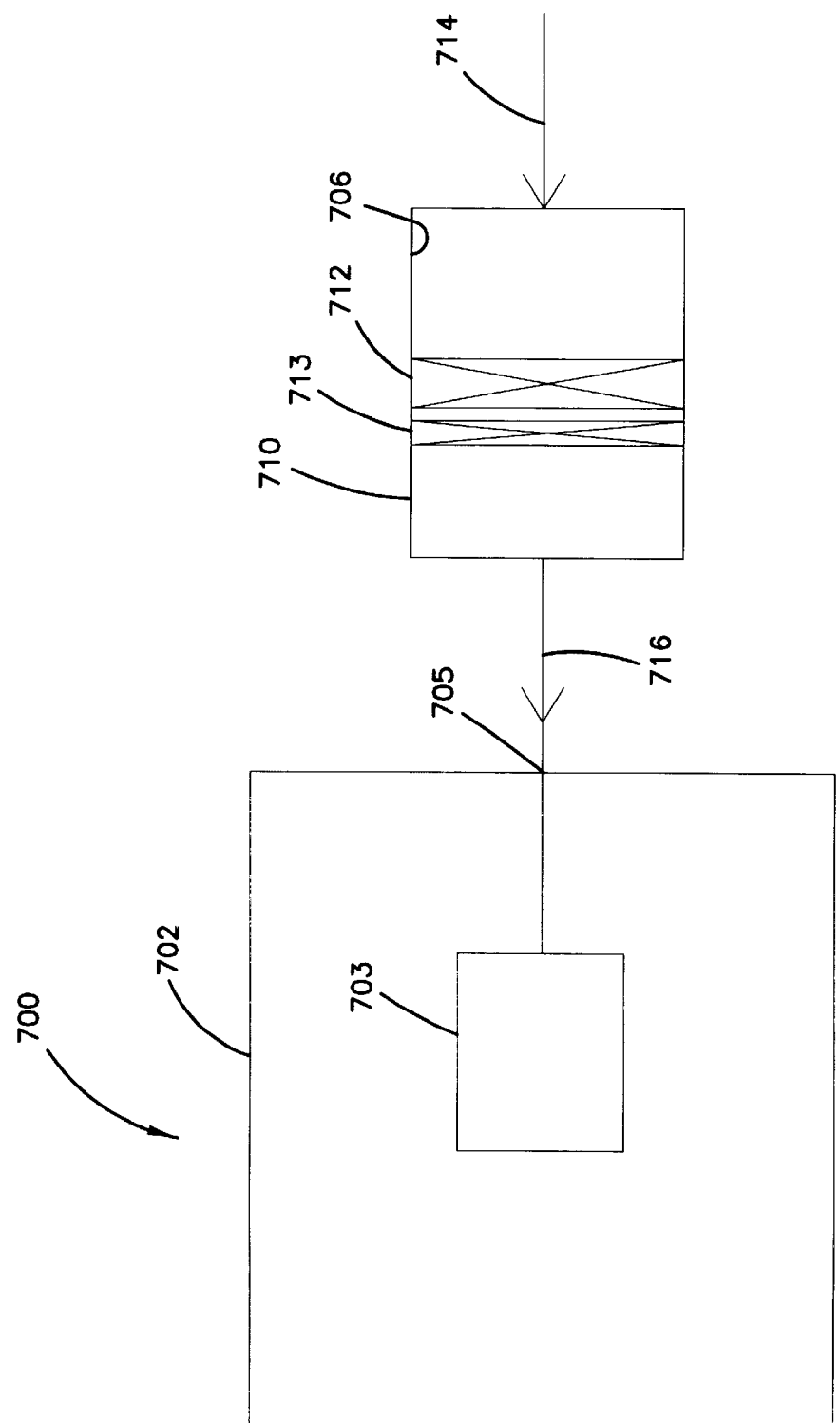
FIG. 4 is a schematic view of one embodiment of a system in which air cleaners according to the present disclosure are used.

The filter constructions and arrangements described herein are usable in a variety of systems. One particular type of system is depicted schematically in FIG. 4 generally at 700. In FIG. 4, equipment 702, such as a vehicle, having an engine 703 with some defined rated air flow demand, for example at least 35 cfm, and typically 45–65 cfm is shown schematically. The equipment 702 may comprise a lawn tractor, golf cart, power boat, or other powered equipment. The engine 703 powers the equipment 702, through use of an air and fuel mixture. In FIG. 4, air flow is shown drawn into the engine 703 at an intake region 705. An air cleaner 710 having a filter construction 712 and a secondary element 713 is upstream of the engine 703. The air cleaner 710 can be constructed to have a resonator 706 integral therewith to reduce the sound pressure level exiting the system 700 upon which the air cleaner 710 is installed.

In general, in operation air is drawn in at arrow 714 into the air cleaner 710 and through the primary element 712 and the secondary element 713. There, particles and contaminants are removed from the air. The cleaned air flows downstream at arrow 716 into the intake 705. From there, the air flows into the engine 703 for use in powering the equipment 702.

B. Overview of the Air Cleaner

Figure 1:
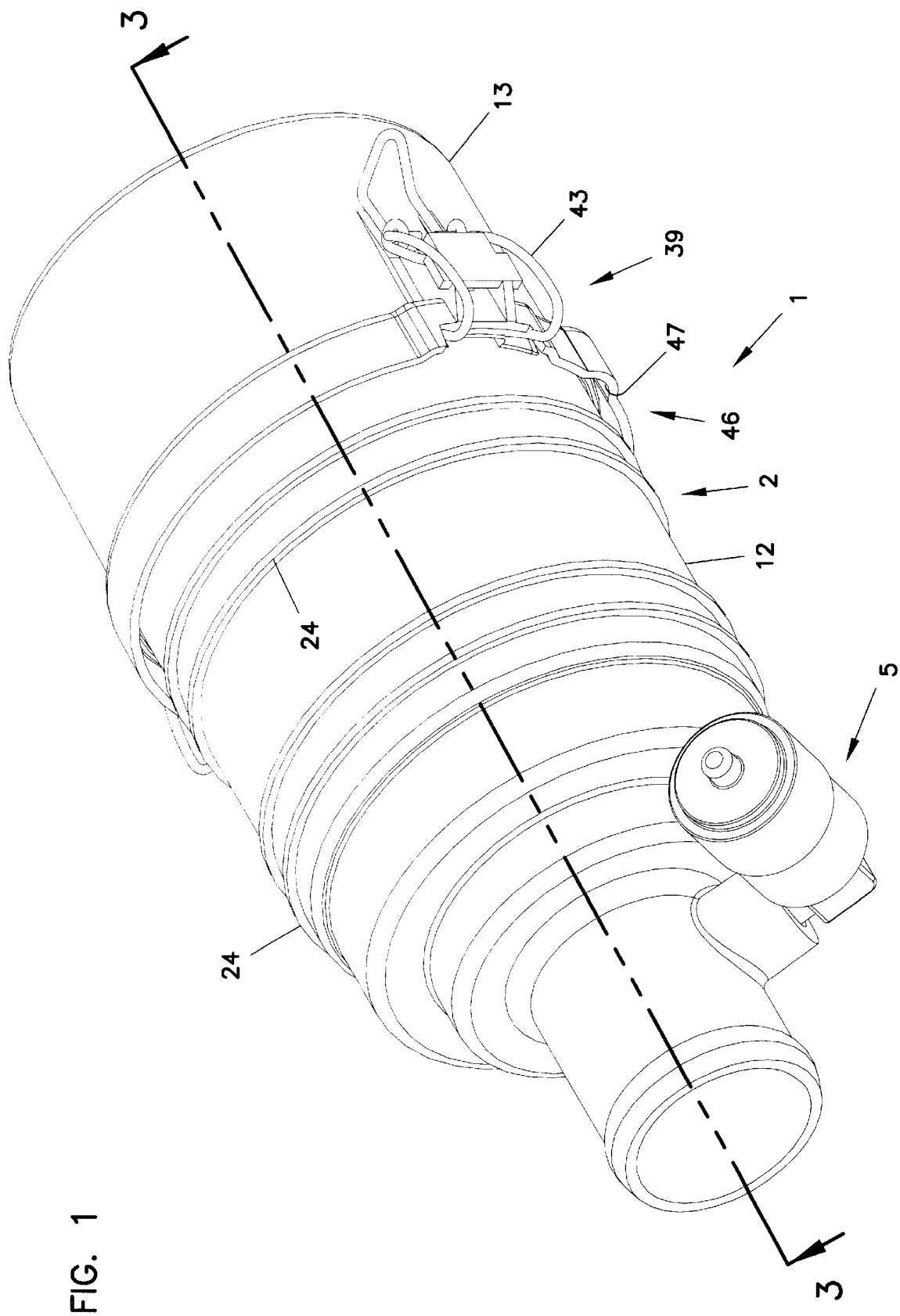
FIG. 1 is a perspective view of one embodiment of an air cleaner, according to principles of this disclosure.
Figure 2:
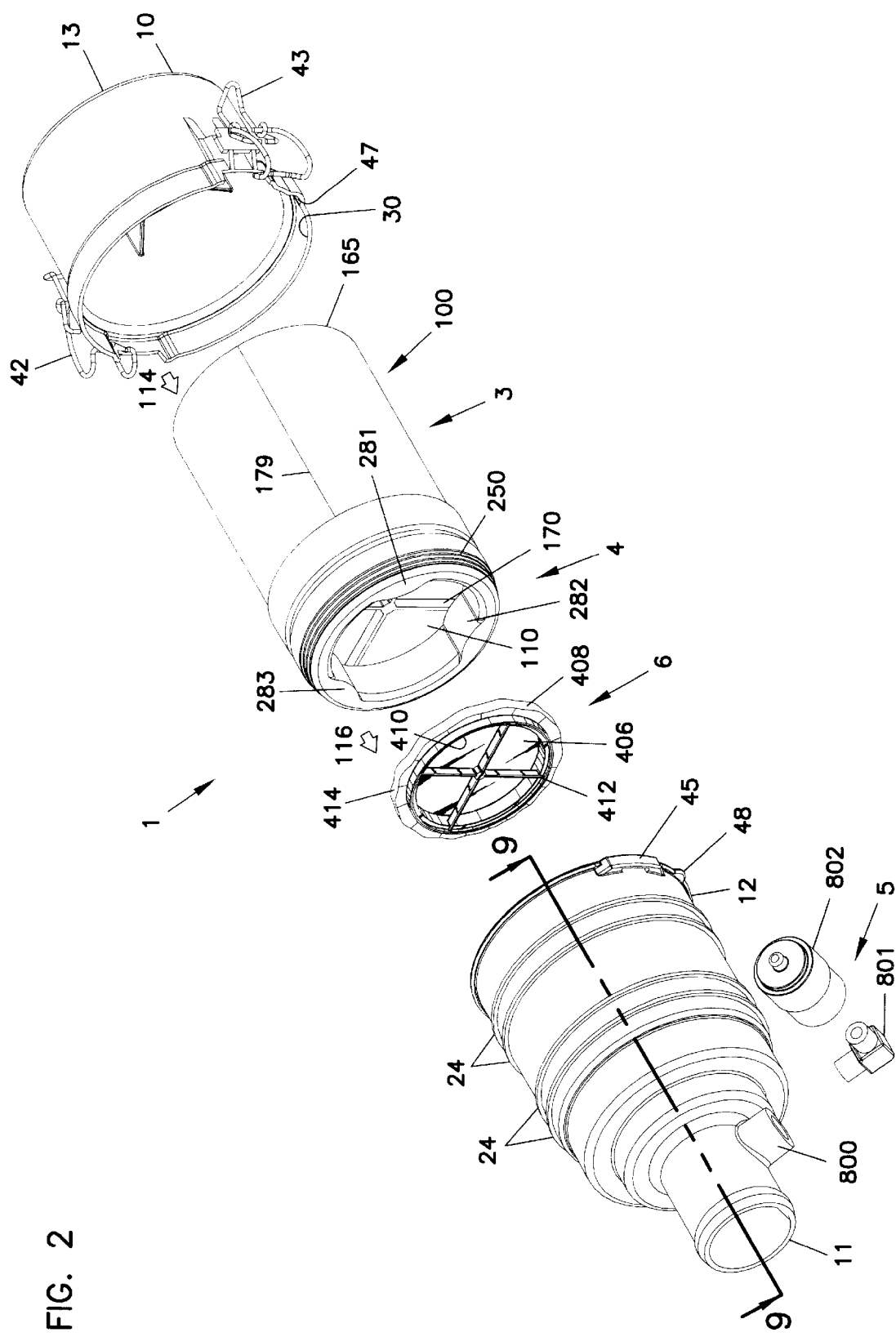
FIG. 2 is an exploded, perspective view of the air cleaner of FIG. 1 and its internal components.
Figure 3:
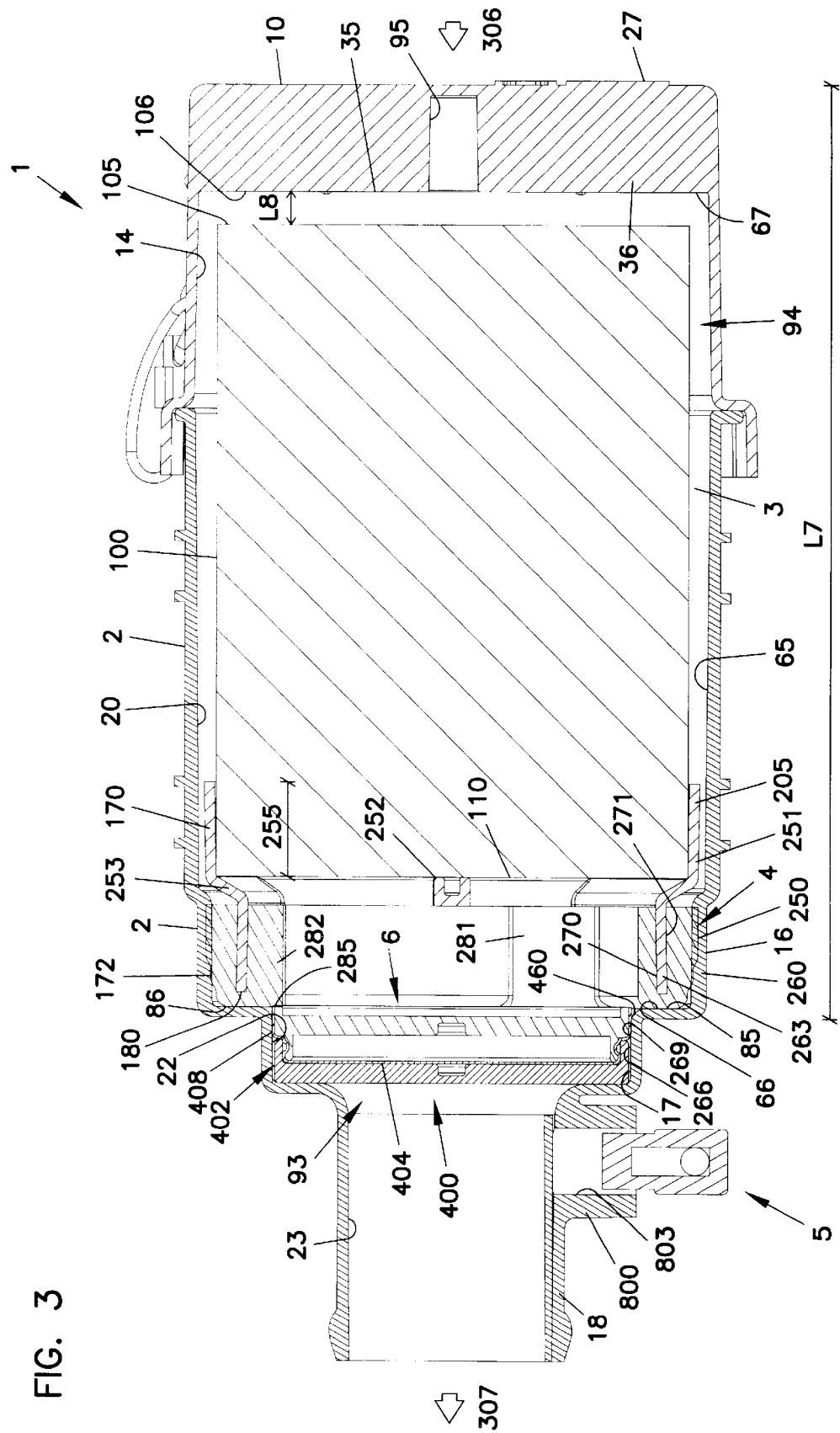
FIG. 3 is a cross-sectional view of the air cleaner housing taken along the line 3—3 of FIG. 1.

Attention is directed to FIGS. 1–3. These FIGS. illustrate an embodiment of an air cleaner, generally designated as reference no. 1. The air cleaner 1 is usable in engine air intake systems, such as system 700, described above.

In FIG. 1, an air cleaner housing 2 is depicted. The air cleaner housing 2 holds or contains internal components for filtering or cleaning air that flows through the housing 2.

FIG. 2 is an exploded, perspective view of an assembly of the air cleaner 1. In the particular embodiment illustrated, the air cleaner 1 includes the housing 2 and an indicator system 5. The housing 2 holds, or contains within it, a media pack 3 and a secondary element 6. The media pack 3 has a filter construction 100 and a sealing system 4.

When the particular air cleaner 1 depicted in FIG. 2 is operably constructed and assembled together, the air cleaner 1 will have the cross-section as shown in FIG. 3. By the term "operably," it is meant that during use in the system 700 (FIG. 4), when the air cleaner 1 is removing particulate matter from an air stream, the air cleaner 1 will be configured and arranged as illustrated in FIG. 3. FIG. 3 demonstrates the general, overall operation of the air cleaner 1: (a) fluid, such as air, enters the housing 2 at an inlet or first end 10 in the direction of arrow 306; (b) passes through the media pack 3, where particulate matter is removed from the fluid; (c) passes through the secondary element 6; and (d) exits the housing 2 at an outlet or second end 11 in the direction of a arrow 307. In preferred embodiments, the housing 2 is constructed and arranged to act as a resonator 14. As such, when air moves through the housing 2, the resonator 14 will decrease the sound pressure level exiting the system 700 (FIG. 4). When the optional indicator system 5, typically a conventional restriction indicator, is used with the air cleaner 1, the indicator system 5 will provide an indication of when the media pack 3 is occluded and requires servicing.

As can be seen in FIG. 3, when media constructions such as filter constructions 100 of the type shown are used in the housing 2, the sealing system 4 is needed to ensure that air flows through the filter constriction 100, rather than in a path that bypasses the filter construction 100.

When constructions of the type shown in FIG. 3 are used, the media pack 3 will be removable and replaceable from the housing 2. After a period of use, when the media pack 3 is serviced, debris and contaminants may be knocked from the media pack 3. The secondary element 6 operates to catch debris and contaminants and prevent these contaminants from being sucked into the engine.

Further details on the construction and methods of the air cleaner 1 follow.

C. The Housing 2

A variety of embodiments of housings for the air cleaner 1 are possible. A preferred housing construction 2 is illustrated in perspective in FIG. 1. An exploded view of the housing 2 is shown in FIG. 2.

Figure 9:
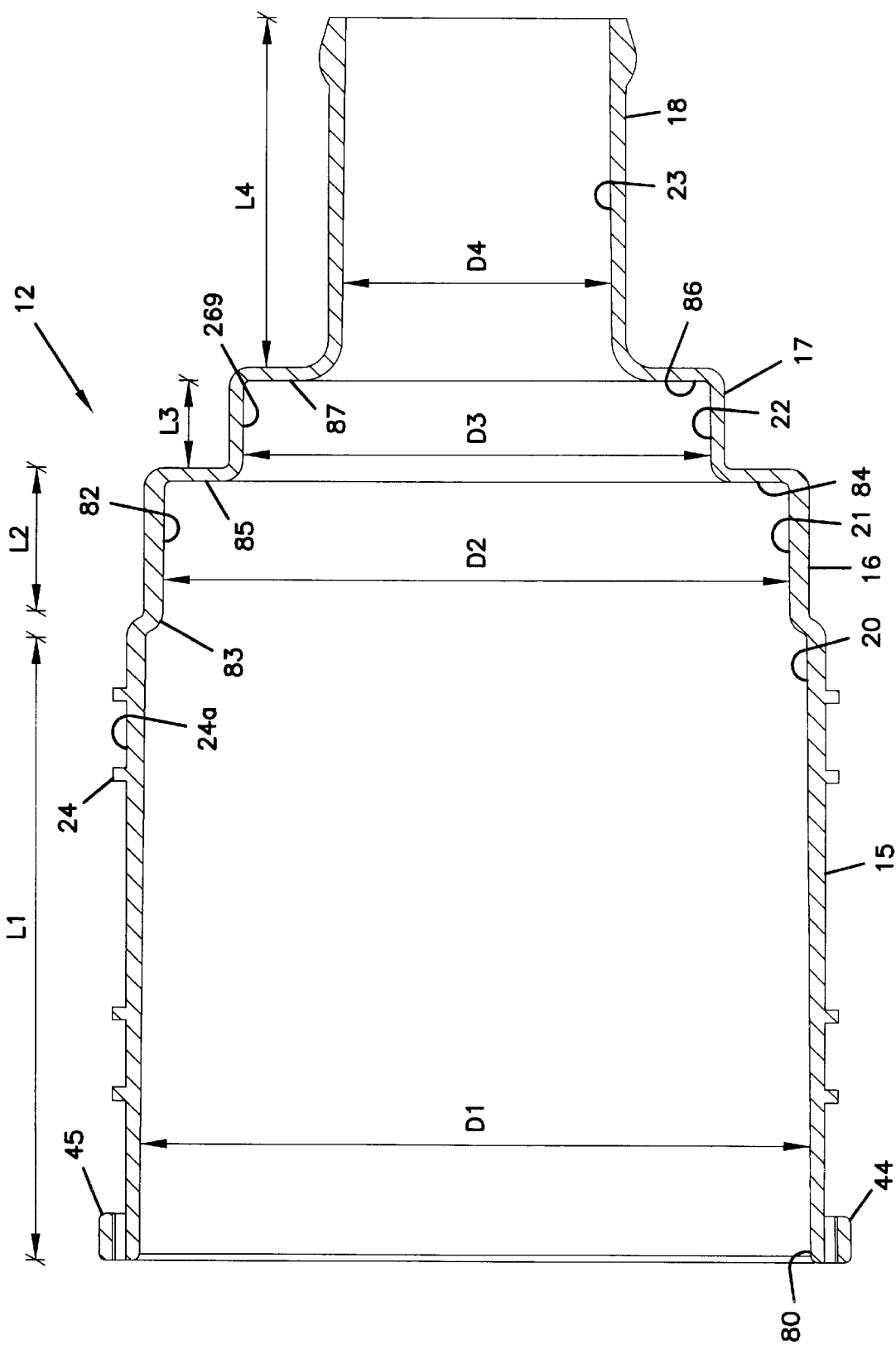
FIG. 9 is a cross-sectional view of one embodiment of a body member of the air cleaner housing depicted in FIG. 1 taken along the line 9—9 of FIG. 2.

In the particular embodiment illustrated in FIG. 2, the housing 2 preferably includes a body member or portion 12 and a cover or cup portion 13. Attention is directed to FIG. 9. FIG. 9 is a cross-sectional view of the body 12. In general, the body 12 includes a first media chamber exterior wall 15, a sealing chamber exterior wall 16, a secondary element exterior wall 17, and an outlet exterior wall 18.

When the housing 2 is constructed according to principles herein, the first media chamber exterior wall 15 will define a first media chamber 20. The first media chamber 20 is configured for receiving, holding, and containing a portion of the media pack 3. This can be seen in the cross-section of FIG. 3. The first media chamber exterior wall 15 will have a cross-sectional configuration selected by the system designer, based on space considerations, manufacturing techniques, and other factors. In the particular embodiment illustrated, the first media chamber 20 is cylindrical, or has a slight frusto-conical shape, with a circular cross-section, having a first diameter D1 and a first axial length L1. It should be noted that the use of the term "cylindrical" herein denotes a general shape. After demolding, during manufacture, a draft angle may cause the housing 2 to have a slight angle or frusto-conical shape rather than a cylindrical shape.

In reference again to FIG. 9, the sealing chamber exterior wall 16 defines a sealing chamber 21. The sealing chamber 21 defines a sealing surface 82. The sealing surface 82 provides a rigid surface for receiving compression pressure of the sealing system 4. This will be described in further detail below, in conjunction with the description of the sealing system 4. In the embodiment illustrated, the sealing chamber 21 is cylindrical with a circular cross-section having a second diameter D2 and a second axial length L2. As such, the sealing surface 82, in the particular embodiment shown, is an annular, radial sealing surface 82. The diameter D2 is smaller than the diameter D1 of the first media chamber 20. As a result, there is a step 83 between the first media chamber 20 and the sealing chamber 21.

The body member 12 also defines a first seat 84. The seat 84 is preferably configured for acting as a stop for properly positioning and orienting the media pack 3 within the body member 12. In the particular arrangement shown in FIG. 9, the seat 84 includes a surface 85 angled relative to the sealing surface 82. The surface 85 of the seat 84 can be angled between 60°–120°, typically 70–110°, and in the particular embodiment illustrated about 90°, relative to the sealing surface 82. The stop surface 85 will axially engage, or abut, an end axial surface 86 (FIG. 3) of the sealing system 4.

Adjacent to the stop surface 85 is a secondary element chamber 22. The secondary element chamber 22 is defined by the secondary element exterior wall 17. The secondary element chamber 22 has an inner wall 269, which corresponds to an opposite side from the exterior wall 17. As will be explained further below, the inner wall 269 acts as an engagement surface such that a portion of the secondary filter element 6 can be compressed thereagainst. This will be discussed in further detail below, in connection with the discussion of the secondary filter element 6. The secondary element chamber 22 also includes a seat 86 for helping the proper orientation and positioning of the secondary filter element 6 in the body member 12. In particular, the secondary filter element seat 86 has a surface 87 that will axially engage or abut an axial surface of the secondary filter element 6. The stop surface 87 is angled relative to the engagement surface 269, in order to provide the stopping or engagement purposes. The surface 87 can be angled relative to the engagement surface 269 in a range between about 60°–120°, typically 70°–110°, and in the particular embodiment illustrated, about 90°.

Still in reference to FIG. 9, in the particular embodiment shown, the secondary element chamber 22 is cylindrical with a circular cross-section, which has a third diameter D3 and a third axial length L3. As can be seen in FIG. 9, D3 is smaller than the diameter of D2 (the sealing chamber 21) and D1 (the diameter of first media chamber 20). This construction allows for insertion and removal of the secondary filter element 6 through an opening 80 defined by the body member 12, through the first media chamber 20, through the sealing chamber 21, and into the secondary element chamber 22.

Still in reference to FIG. 9, the outlet exterior wall 18 is depicted as adjacent to the secondary element chamber 22. The outlet exterior wall 18 defines an outlet 23, through which air exits the air cleaner assembly 1. The outlet 23, in the embodiment illustrated, is angled relative to the stop surface 87 by an angle of between 70°–110°, and in the one shown in the drawing, about 90°. Also, in the particular embodiment illustrated, the outlet 23 is cylindrical with a fourth axial length L4 and a circular cross-section of a fourth diameter D4.

In the particular embodiment illustrated in FIGS. 2 and 9, the first media chamber exterior wall 15 includes integral ridges or ribs 24. Preferably, the ribs 24 are continuous around the outside circumference of the first media chamber exterior wall 15. In general, the ribs 24 provide additional structural integrity or strength to the overall housing 2. In the particular embodiment illustrated, the ribs 24 are ornamental, eye-catching, and distinctive to Donaldson, the assignee.

Figure 7:
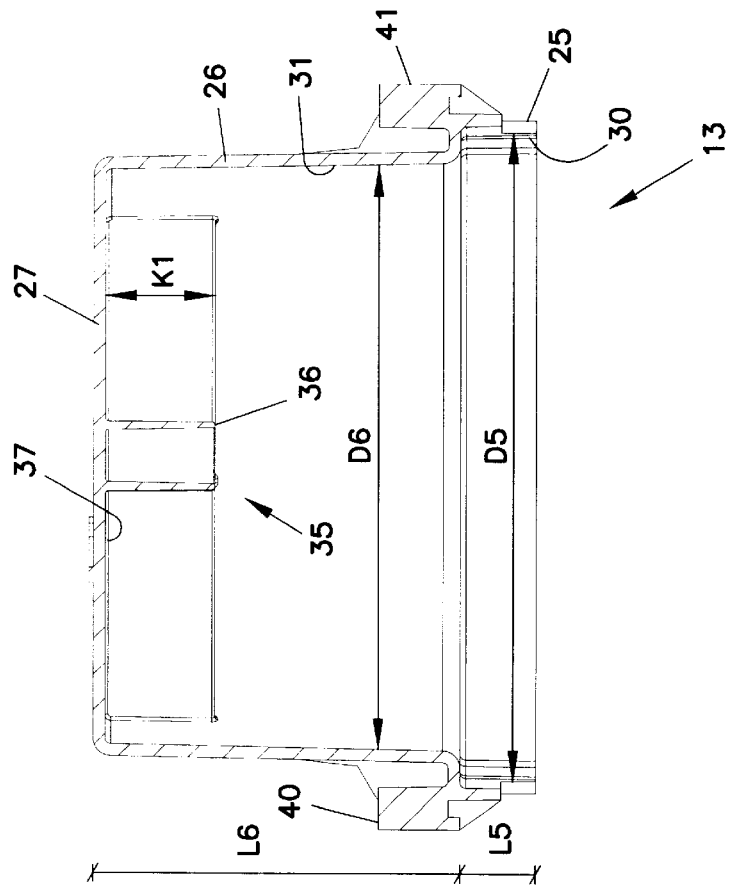
FIG. 7 is a cross-sectional view of the cup depicted in FIG. 6 taken along the line 7—7 of FIG. 8.

Attention is directed to FIG. 7. FIG. 7 is a cross-sectional view of the cup portion 13 of the housing 2 (FIG. 2). In general, the cover or cup 13 includes a body chamber exterior wall 25, a second media pack exterior wall 26, and a top wall, or inlet, 27.

Preferably, the body chamber exterior wall 25 defines a body chamber 30 arranged and configured to receive the body portion 12 (FIG. 2) of the housing 2 (FIG. 2). During assembly, the first media pack exterior wall 15 of the body portion 12 is designed to fit within the body chamber 30. In the particular embodiment illustrated, the body chamber 30 is cylindrical and has a fifth diameter D5 and a fifth axial length L5.

Preferably, the second media pack exterior wall 26 defines a second media pack chamber 31 arranged and configured to receive a portion of the media pack 3 (FIG. 2). In the embodiment depicted, the second media pack chamber 31 is cylindrical and has a sixth diameter D6 and a sixth axial length L6.

Preferably, the top wall 27 secures the media pack 3 (FIG. 2) within the housing 2 (FIG. 2) and allows air to enter the air cleaner assembly 1 (FIG. 1) while preventing large objects, such as sticks, leaves, and butterflies, from entering the housing 2.

In the particular embodiment illustrated in FIG. 7, the cup portion 13 further includes a support structure 35. The support structure 35 provides support for holding the media pack 3 (FIG. 2) placed within the housing 2 (FIG. 2) and prevents axial slippage of the media pack 3 during use. Referring to FIG. 3, typically, the support structure 35 is not in touchable engagement with the media pack 3. Preferably, a gap 106, having an eighth axial length of L8, exists between the media pack 3 and the support structure 35. During use, this gap 106 helps distribute the inlet air stream 306 throughout the face 105 of the media pack 3. During use, forces exerted on the air cleaner assembly 1 may cause the media pack 3 to vibrate loose. In other words, the media pack 3 may become dislodged from its sealing engagement, described in detail below, with the housing 2. In this event, the support structure 35 prevents the media pack 3 from becoming completely dislodged and thereby ensures a sealing engagement between the media pack 3 and the housing 2.

In alternative embodiments the gap 106 may be partially filled with a ring or gasket (not shown) to ensure minimal axial slippage of the media pack 3, thereby ensuring that the media pack 3 remains in sealing engagement with the housing 2.

The support structure 35 also helps to maintain an air space 37 between the top wall 27 of the cup portion 13 and the media pack 3 when assembled. In addition, the support structure 35 partially creates an expansion chamber 65 for sound, as will be discussed in more detail below. This air space 37 improves the air flow through the media pack 3, as will be described in more detail below.

Figure 8:
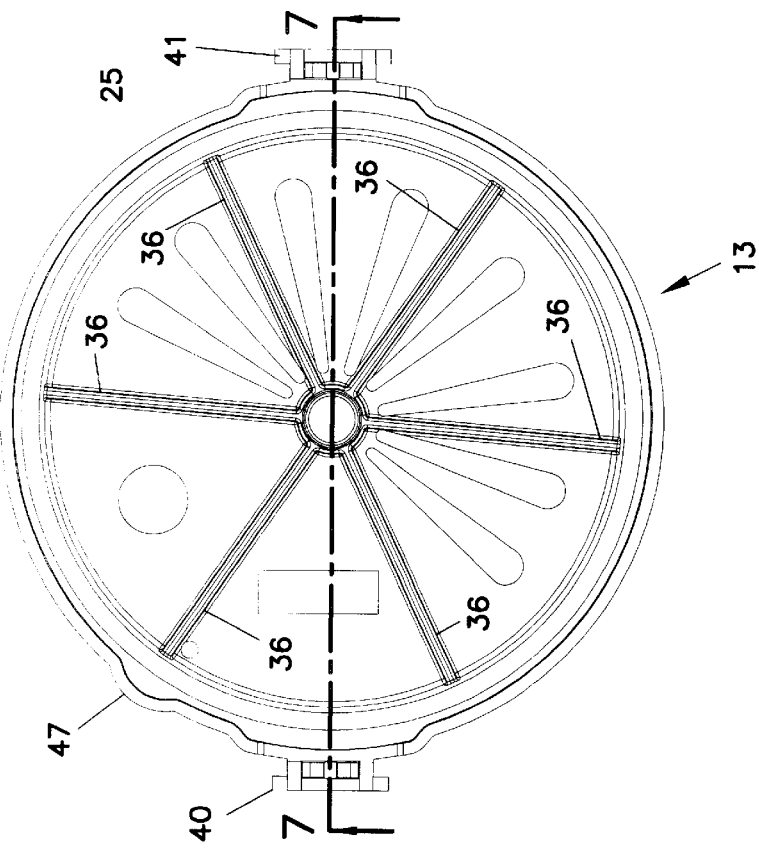
FIG. 8 is an opposite end elevational view of the cup depicted in FIG. 6.

The support structure 35 generally extends from the top wall 27 of the cup 13 into the second media pack chamber 31 a first distance K1. Preferably, the support structure 35 comprises a plurality of fins or ribs 36 as illustrated in FIGS. 7 and 8. FIG. 8 is an end elevational view of the inside of the cup portion 13. The fins 36 extend from the top wall 27 of the cup 13 and typically are integral with the top wall 27.

Referring back to FIGS. 1 and 2, preferably, the housing 2 includes a securing system 39 for securing the cup 13 to the body 12. In typical applications, the securing system 39 includes first and second latches 42, 43. Latch connections such as those described in U.S. Pat. Nos. 5,547,480, 5,545, 241, and Des. 399,119, incorporated herein by reference, can be used. In alternative embodiments, the securing system 39 may include a twist lock mechanism as described in co-pending, commonly assigned, U.S. patent applications Ser. No. 08/928/684, filed Sep. 12, 1997, now U.S. Pat. No. 6,051,042, and Ser. No. 09/146,291, filed Sep. 3, 1998, now U.S. Pat. No. 6,034,778 entitled "Air Cleaner Assembly; and Method," hereby incorporated by reference.

In the particular embodiment illustrated in FIG. 7, the cup portion 13 includes first and second latch supports 40, 41. Referring back to FIG. 2, the latches 42, 43 are mounted on the first and second latch supports 40, 41 (FIG. 7). In the particular embodiment illustrated in FIG. 9, the body portion 12 also includes first and second latch extensions 44, 45. Referring back to FIGS. 1 and 2, the latches 42, 43 are designed to hook or latch the first and second latch extensions 44, 45 to secure the cup 13 to the body 12 of the housing 2.

Preferably, the body chamber 30 of the cup 13 is arranged and configured to receive the first and second latch extensions 44, 45. Referring back to FIG. 8, the body chamber exterior wall 25 includes first and second latch extension regions 46, 47, axially aligned with the latch supports 40, 41, respectively. The first and second latch extension regions 46, 47 are arranged and configured to receive the first and second latch extensions 44, 45, respectively as illustrated in FIG. 1. In this manner, the first and second latch extension regions 46, 47 and the first and second latch extensions 44, 45 helps to ensure that the cup 13 is appropriately aligned with the body 12 prior to securing the cup 13 to the body 12.

Referring back to FIG. 1, the housing 2 further includes an optional radial alignment system 46. In the particular embodiment illustrated in FIGS. 1 and 2, the alignment system includes an alignment ridge, protrusion, or bump 48 on the body 12 and an alignment region or channel 47 in the body chamber 30 of the cup 13. The alignment channel 47 is arranged and configured to receive the alignment ridge 48. During assembly, the alignment ridge 48 and the alignment channel 47 ensure that the cup can be oriented only in one direction with respect to the body member 12. This ensures proper air flow through the air cleaner assembly 1, as will be described in more detail below. In other embodiments, the ridge 48 may be on the cup 13, while the channel 47 is on the body member 12.

Figure 6:
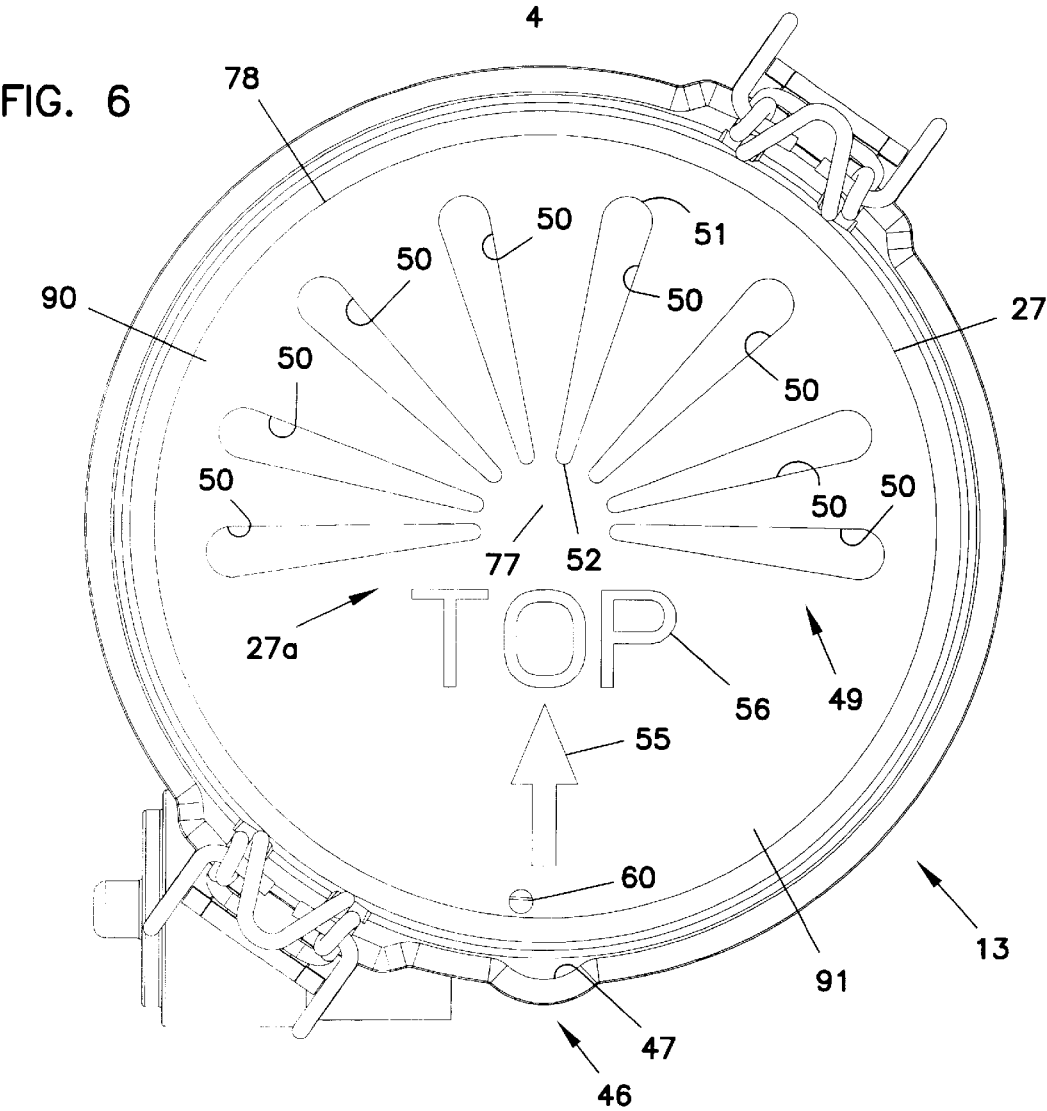
FIG. 6 is an end elevational view of one embodiment of a cup of the air cleaner housing shown in FIG. 1.

Attention is directed to FIG. 6. FIG. 6 is an end elevational view of one embodiment of the cup portion 13 of the air cleaner assembly 1 shown in FIG. 1. In the particular embodiment illustrated in FIG. 6, the top wall 27 defines an inlet arrangement 27a for intaking air flow into the housing 2. In preferred embodiments, the inlet arrangement 27a will include a radial diffuser 49 for distributing the air flow through the media pack 3 (FIG. 2). In the particular embodiment illustrated in FIG. 6, the radial diffuser 49 comprises a plurality of slots 50. The slots 50 allow a fluid, such as air, to enter the air cleaner assembly 1 (FIG. 1) while restricting large objects, such as sticks, from entering the air cleaner assembly 1. Preferably, the slots 50 are designed for efficient air flow through the air cleaner assembly 1.

In the particular embodiment illustrated in FIG. 6, the slots are diverging-converging openings or tear shaped. By the term "tear shaped," it is meant that the slots 50 have a wider opening at a first end 51 than at a second end 52. The wider opening at the first end 51 allows more air to enter the assembly 1 around the outer circumference of the assembly 1. The narrower opening at the second end 52 restricts the air entering the assembly 1 near the center of the assembly 1. Each of the slots 50 is tapered from the wider opening at the first end 51, down toward the opening at the second end 52. This particular arrangement improves air flow and filtration capacity since a larger surface area of media exists at the outer circumference of the media pack 3 (FIG. 2) than at the center of the media pack 3. By directing a larger volume of air around the outer circumference of the media pack 3, greater filtration capacity is achieved.

Still in reference to FIG. 6, preferably, the slots 50 are placed in generally the upper half 90 of the top wall 27 of the cup 13. By the term "upper half," it is meant that when the air cleaner assembly 1 is installed in the system 700 (FIG. 4), the top wall 27 will be arranged to be within a vertical plane such that the top wall 27 will have an upper half with a higher vertical elevation than a lower half 91 of the top wall 27. In typical applications, the air cleaner assembly I is oriented such that the slots 50 align with an opening (not shown) in a shroud or hood of equipment for which the air cleaner assembly 1 is designed. For example, on garden tractors, the hood of the garden tractor contains an opening for air flow. The air cleaner assembly 1 is mounted within the hood such that the slots 50 of the cup 13 generally align with the opening in the hood of the garden tractor. This ensures maximum air flow through the air cleaner assembly 1.

In the particular embodiment illustrated, the top wall 27 includes an arrow 55 and the word "top" 56 to ensure proper orientation by the user of the air cleaner assembly 1 with the openings in the hood of the garden tractor. In addition, preferably, the housing 2 includes the alignment system 46 previously discussed to ensure proper orientation. In the particular embodiment illustrated in FIG. 6, the slots 50 are arranged in a semi-circular array, with each of the slots extending radially from a center 77 of the top wall 27 toward the outer periphery 78 of the top wall 27.

In the particular embodiment illustrated, the top wall 27 includes a drain hole 60 near the lower half of the top wall 27 of the cup 13. The drain hole 60 allows any liquid, such as water or water condensation, that may enter the air cleaner assembly 1, to drain out of the air cleaner assembly 1 through the drain hole 60. The alignment system 46 helps to ensure that the drain hole 60 is oriented at or near the bottom of the air cleaner 1.

Although the particular body 12 and cup 13 depicted are preferred for the housing 2, many different embodiments are possible. The embodiment depicted, however, is particularly convenient for manufacturing techniques, such as injection molding. Further, the particular housing 2 depicted is preferred because it is attractive in appearance, eye-catching, and distinctive to Donaldson, the assignee. Further views of the housing 2 are depicted in co-pending and commonly assigned U.S. patent application Ser. No. 29/101,190 pending, filed the same date herewith, and entitled, "In-line Air Cleaner," which application is incorporated by reference herein.

D. The Resonator 14

In certain preferred systems, the housing 2 is constructed and arranged to act as a resonator 14. That is, in preferred constructions, the housing 2 is constructed and arranged to reduce the sound pressure level exiting the system 700 (FIG. 4). When constructed according to the following principles, the resonator 14 will reduce the sound pressure level by at least 1 dB(A), typically between 1.5 and 3 dB(A), when compared to an air cleaner with an open end; that is, an air cleaner where an end of a media pack is not covered by a portion of a housing of the air cleaner. This sound pressure level decrease can be measured with equipment such as a Larson Davis Real Time Analyzer, with the microphone mounted about 30 inches above the seat of the equipment, such as a garden tractor. Alternatively, equipment such as an Aachen Head can be used, again, with the simulated head mounted about 30 inches above the seat of the equipment.

Attention is directed to FIG. 3. FIG. 3 is a cross-sectional view of the assembled air cleaner assembly 1 of FIG. 1. Preferably, the length L7 of an expansion chamber 65, which includes both the first and second media pack chambers 20, 31 (FIGS. 7 and 9) of the body 12 and the cup 13, respectively, and the inlet 27 are constructed and arranged to act as the resonator 14. L7 extends between the inlet wall 27 and the first seat surface 86. Preferably, the overall length L7 of the expansion chamber 65 is equal to the speed of sound divided by 4 times the frequency desired to be removed by the resonator 14. This particular length L7 of the expansion chamber 65 causes the sounds waves to bounce back and forth, canceling each other, according to sound pressure principles commonly known. The frequency desired to be removed by the resonator 14 is dependent on the particular source impedance of the downstream equipment. For example, a Yanmar, twin cylinder diesel engine operating at rated conditions and having a 20 horsepower rating, has a predominate source strength frequency at 500 hertz. Knowing this source strength frequency, the length L7 of the expansion chamber 65 is determined. A ratio of the length L7 of the expansion chamber 65 to the open area equivalent diameter of the inlet 27 is between about 4.5 and 5.0, for example about 4.7. A ratio of the length L7 of the expansion chamber 65 to the largest outermost sectional dimension (in the particular illustrated embodiment, diameter) is at least 1.5, and typically between about 1.75 and 2.00, for example, about 1.8.

In addition, the inlet arrangement 27a is arranged and constructed to have an opening that has a smaller cross-sectional area than the opening of the outlet chamber 23. The smaller cross-sectional area of the inlet 27a acts to restrict the sound from exiting the inlet 27a. Preferably, the inlet 27a has a cross-sectional area that is at least 3 percent smaller than the cross-sectional area of the outlet 23, and typically between 5 and 10 percent smaller.

The expansion chamber 65 reduces, within the space constraints, the radiated sound of the predominate source strength frequency through the inlet 27 by destructive interference. Sound waves with frequencies above a few hundred Hertz are further attenuated by acoustic attenuation within the media pack 3, according to sound absorption principles commonly known. The configuration thus provides effective broadband sound absorption and attenuation.

In the particular embodiment illustrated, the expansion chamber 65 is cylindrical and has a diameter about at least 80 percent, and typically 100 to 250 percent larger than the largest cross-sectional dimension (in this case, diameter) of the outlet 23.

Still in reference to FIG. 3, there is a non-internal tube construction 93 within the interior of the housing 2 between the media pack 3 and the outlet 23. By the term "non-internal tube construction", it is meant that there are no internal tubular structures for sound attenuation mounted within the housing 2. In other words, the housing 2 is constructed and arranged to attenuate sound with the resonator 14 without any additional tubes located therewithin. In addition, the entire housing 2 includes a non-internal tube construction 94, in that there are no acoustic tubes located anywhere within the housing interior. While there is a negative cylinder at 95 for supporting the fins 36, the negative cylinder 95 does not act as a acoustic tube, and is not within the definition of "non-internal tube construction."

In the particular embodiment illustrated, the resonator 14 is designed to reduce the sound pressure levels exiting the air cleaner assembly 1 without the use of baffles, absorptive packing material, sonic chokes, or other sound attenuating devices. The sound pressure level reduction is achieved by the housing 2 consisting essentially of only the structure as described previously herein.

E. The Media Pack 3

Referring back to FIG. 2, the filter construction 100 depicted is designed to remove particulates from a fluid, such as air, passing through the filter construction 100, while the sealing system 4 is designed to seal the media pack 3 against the sealing chamber exterior wall 16 of the housing 2, as shown in FIG. 3. By the term "seal," it is meant that the sealing system 4, under normal conditions, prevents unintended levels of fluid from passing through a region between the media pack 3 and the sealing chamber exterior wall 16 of the housing 2; i.e., the sealing system 4 inhibits fluid flow from avoiding passage through the media pack 3.

In certain arrangements, the media pack 3 will be configured for straight-through flow. By "straight-through flow," it is meant that the media pack 3 is configured in a construction 100 with a first flow face 105 (corresponding to an inlet end, in the illustrated embodiment) and an opposite, second flow face 110 (corresponding to an outlet end, in the illustrated embodiment), with fluid flow entering in one direction 114 through the first flow face 105 and exiting in the same direction 116 from the second flow face 110. When used with an inline-flow housing, such as the housing 2 of FIG. 1, in general, the fluid will enter through the inlet of the housing in one direction 306, enter the filter construction 100 through the first flow face 105 in the same direction, exit the filter construction 100 in the same direction from the second flow face 110, and exit the housing through the housing outlet 11 also in the same direction 307.

Although the first flow face 105 is described above as corresponding to an inlet end, and the second flow face 110 is described above as corresponding to an outlet end, the inlet and outlet ends can be reversed. That is, the first flow face 105 depicted in FIG. 2 can correspond to an outlet end, while the second flow face 110 depicted in FIG. 2 can correspond to an inlet end.

In FIG. 2, the first flow face 105 and the second flow face 110 are depicted as planar and as parallel. In other embodiments, the first flow face 105 and the second flow face 110 can be non-planar, for example, frusto-conical. Further, the first flow face 105 and second flow face 110 need not be parallel to each other.

Generally, the filter construction 100 will be a wound construction. That is, the construction 100 will typically include a layer of filter media that is turned completely or repeatedly about a center point. Typically, the wound construction will be a coil, in that a layer of filter media will be rolled a series of turns around a center point. In arrangements where a wound, coiled construction is used, the filter construction 100 will be a roll of filter media, typically permeable fluted filter media.

Figure 11:
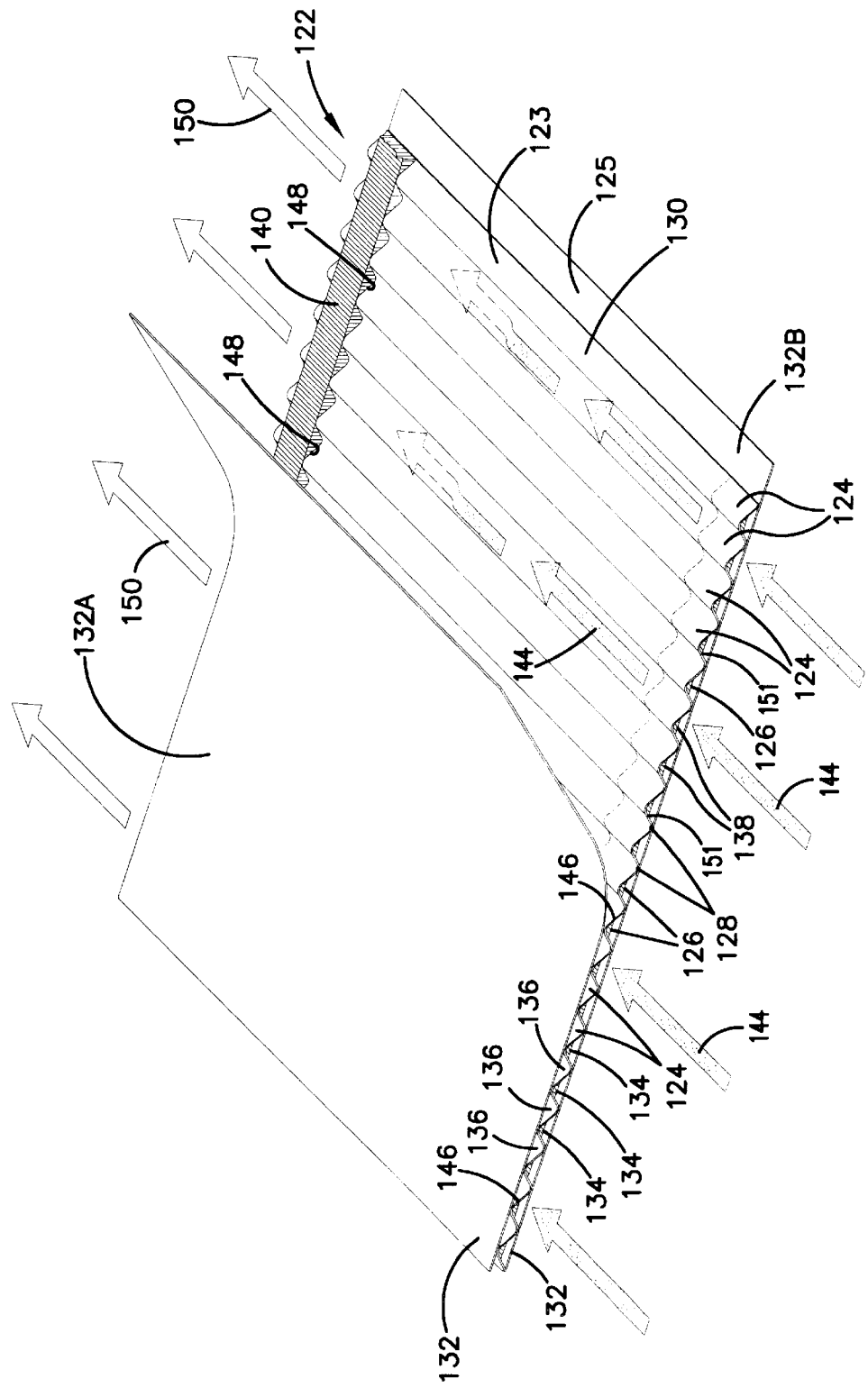
FIG. 11 is a schematic, perspective view of a portion of filter media usable in the media pack shown in FIGS. 2 and 3.

Attention is now directed to FIG. 11. FIG. 11 is schematic, perspective view demonstrating the principles of operation of certain media usable in the filter constructions herein. In FIG. 11, a fluted construction is generally designated at 122. The fluted construction 122 includes: a layer 123 of corrugations having a plurality of flutes 124 and a face sheet 132. The FIG. 11 embodiment shows two sections of the face sheet 132, at 132A (depicted on top of the corrugated layer 123) and at 132B (depicted below the corrugated layer 123). Typically, the media construction 125 used in arrangements described herein will include the corrugated layer 123 secured to the bottom face sheet 132B. When using this media construction 125 in a rolled construction, it typically will be wound around itself, such that the bottom face sheet 132B will cover the top of the corrugated layer 123. The face sheet 132 covering the top of the corrugated layer is depicted as 132A. It should be understood that the face sheet 132A and 132B are the same sheet 132.

When using this type of media construction 125, the flute chambers 124 form alternating peaks 126 and troughs 128. The troughs 128 and peaks 126 divide the flutes into an upper row and lower row. In the particular configuration shown in FIG. 11, the upper flutes form flute chambers 136 closed at the downstream end, while flute chambers 134, having their upstream end closed, form the lower row of flutes. The fluted chambers 134 are closed by a first end bead 138 that fills a portion of the upstream end of the flute between the fluting sheet 130 and the second facing sheet 132B. Similarly, a second end bead 140 closes the downstream end of alternating flutes 136. In some systems, both the first end bead 138 and second end bead 140 are straight along all portions of the media construction 125, never deviating from a straight path. In some systems, the first end bead 138 is both straight and never deviates from a position at or near one of the ends of the media construction 125, while the second end bead 140 is both straight and never deviates from a position at or near one of the ends of the media construction 125. The flutes 124 and end beads 138, 140 provide the media construction 125 that can be formed into filter construction 100 and be structurally self-supporting without a housing.

When using media constructed in the form of media construction 125, during use, unfiltered fluid, such as air, enters the flute chambers 136 as indicated by the shaded arrows 144. The flute chambers 136 have their upstream ends 146 open. The unfiltered fluid flow is not permitted to pass through the downstream ends 148 of the flute chambers 136 because their downstream ends 148 are closed by the second end bead 140. Therefore, the fluid is forced to proceed through the fluting sheet 130 or face sheets 132. As the unfiltered fluid passes through the fluting sheet 130 or face sheets 132, the fluid is cleaned or filtered. The cleaned fluid is indicated by the unshaded arrow 150. The fluid then passes through the flute chambers 134 (which have their upstream ends 151 closed) to flow through the open downstream end 152 (FIG. 12) out the fluted construction 122. With the configuration shown, the unfiltered fluid can flow through the fluted sheet 130, the upper facing sheet 132A, or lower facing sheet 132B, and into a flute chamber 134.

Typically, the media construction 125 will be prepared and then wound to form the rolled filter construction 100 (FIGS. 3 and 12) of filter media. When this type of media is selected for use, the media construction 125 prepared includes the sheet of corrugations 123 secured with the end bead 138 to the bottom face sheet 132B (as shown in FIG. 11, but without the top face sheet 132A). In these types of arrangements, the media construction 125 will include a leading edge at one end and a trailing edge at the opposite end, with a top lateral edge and a bottom lateral edge extending between the leading and trailing edges. By the term "leading edge," it is meant the edge that will be initially turned or rolled, such that it is at or adjacent to the center or core of the rolled construction. The "trailing edge" will be the edge on the outside of the rolled construction, upon completion of the turning or coiling process.

The leading edge and the trailing edge should be sealed between the corrugated sheet 123 and the bottom face sheet 132B, before winding the sheet into a coil, in these types of media constructions 125. While a number of ways are possible, in certain methods, the seal at the leading edge is formed as follows: (a) the corrugated sheet 123 and the bottom face sheet 132B are cut or sliced along a line or path extending from the top lateral edge to the bottom lateral edge (or, from the bottom lateral edge to the top lateral edge) along a flute 124 forming a peak 126 at the highest point (or apex) of the peak 126; and (b) sealant is applied between the bottom face sheet 132B and the sheet of corrugations 123 along the line or path of cut. The seal at the trailing edge can be formed analogously to the process of forming the seal at the leading edge. While a number of different types of sealant may be used for forming these seals, one usable material is a non-foamed sealant available from H. B. Fuller of St. Paul, Minn., identified under the designation HL0842.

Figure 12:
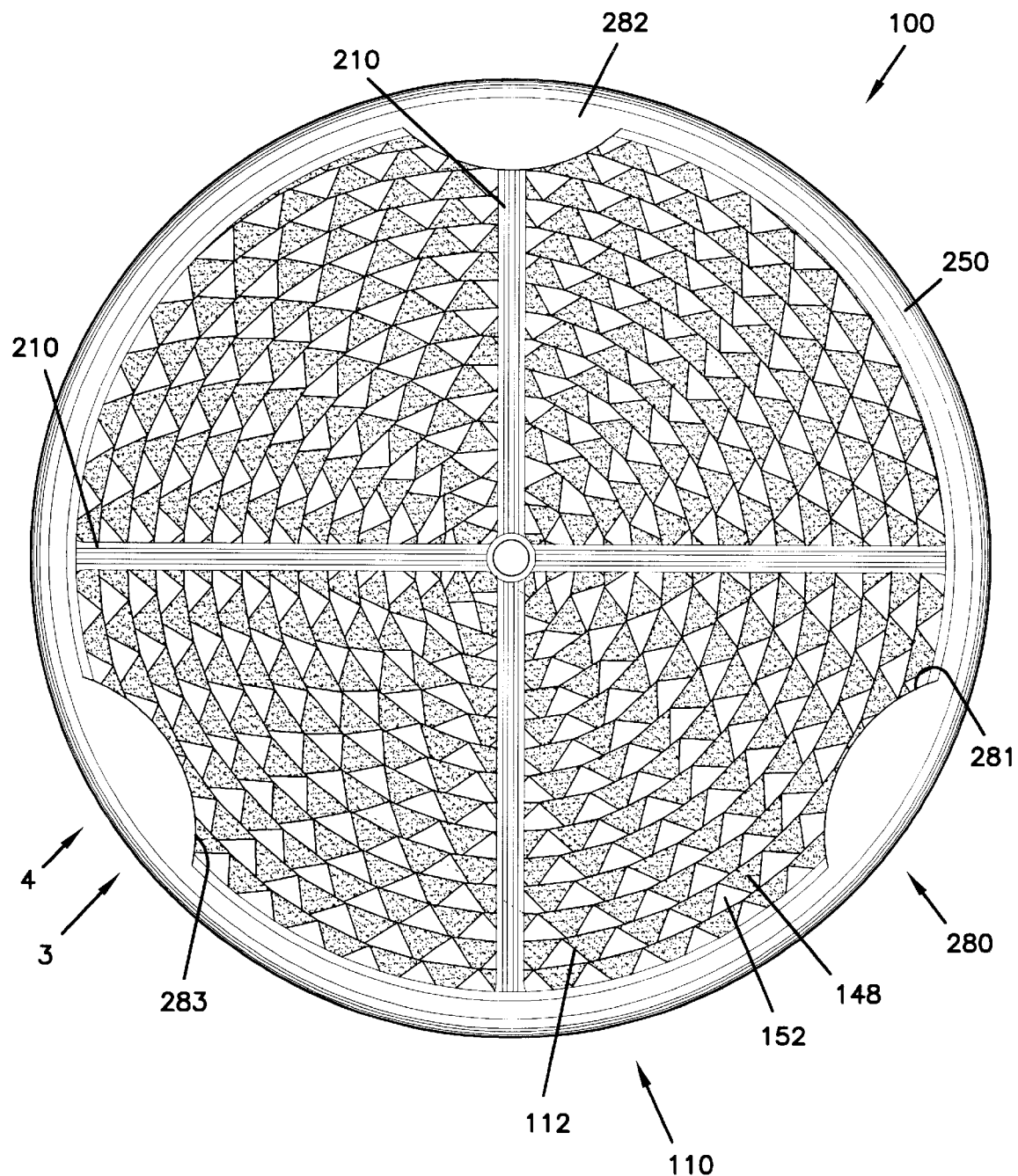
FIG. 12 is a schematic, end view of the media pack depicted in FIGS. 2 and 3, according to principles of the present disclosure.

When using the media construction 125, it may be desired by the system designer to wind the construction 125 into a rolled construction of filter media, such as the filter construction 100 of FIG. 12. FIG. 12 is a schematic, end view of the media pack 3. A variety of ways can be used to coil or roll the media. The media construction 125 may be wound about a center mandrel or other element to provide a mounting member for winding. The center mandrel may be removed or left to plug to act as a core at the center of the cylindrical filter construction 100. It can be appreciated that non-round center winding members may be utilized for making other filtering construction shapes, such as filter constructions having an oblong, oval, rectangular, or racetrack-shaped profile, and can be usable in filtering systems herein. Various filter constructions with non-circular (as well as circular) cross-sections are described in co-pending, commonly assigned, U.S. patent application Ser. No. 09/258,481 pending, entitled, "Filter Arrangement; Sealing System; and Methods," filed the same date herewith, and herein incorporated by reference. Further view of various filter constructions that may be usable herein are depicted in copending and commonly assigned U.S. patent application Ser. No. 29/101,193 pending, filed the same day herewith, and entitled, "Filter Element Having Sealing System," herein incorporated by reference.

Still in reference to FIG. 11, the media construction 125 can also be wound without a mandrel or center core. One method of forming a coreless rolled construction is as follows: (a) the troughs 128 of the first few corrugations of the corrugated sheet 123 spaced from the leading edge are scored from the top lateral edge to the bottom lateral edge (or from the bottom lateral edge to the top lateral edge); for example, the first four corrugations from the leading edge will have a score line cut along the troughs 128; (b) the bead 140 of sealant is applied along the top of the sheet of corrugation 123 along the lateral edge opposite from the lateral edge having end bead 138; (c) the leading edge is initially turned or rolled over against itself and then pinched together to be sealed with the sealant bead 140; and (d) the remaining corrugated sheet 123 having the bottom face sheet 132B secured thereto is coiled or rolled or turned around the pinched leading edge.

In other methods, coreless constructions can be made from the media construction 125 by automated processes, as described in U.S. Pat. Nos. 5,543,007 and 5,435,870, each incorporated by reference herein. In still other methods, the media construction can be rolled by hand.

When using rolled constructions, such as the filter construction 100, the system designer will want to ensure that the outside periphery of the construction 100 is closed or locked in place to prevent the filter construction 100 from unwinding. There are a variety of ways to accomplish this. In some applications, the outside periphery is wrapped with a periphery layer. The periphery layer can be a non-porous, adhesive material, such as plastic with an adhesive on one side. When this type of layer is utilized, the periphery layer prevents the filter construction 100 from unwinding and prevents the fluid from passing through the outside periphery of the filter construction 100, maintaining straight-through flow through the filter construction 100.

In some applications, the filter construction 100 is secured in its rolled construction by sealing the trailing edge of the media construction 125 with an adhesive or sealant along a line 179 (FIG. 2) to secure the trailing edge to the outside surface of the filter construction 100. For example, a bead of hot-melt may be applied along the line 179.

Attention is again directed to FIG. 12. In FIG. 12, the second flow face 110 is shown including the open ends 152 and closed ends 148. Top and bottom plan views, as well as side elevational views of the media pack 3 and the sealing system 4 usable in the systems and arrangements described herein are depicted in copending and commonly assigned U.S. patent application Ser. No. 29/101,193 pending, filed the same day herewith, and entitled, "Filter Element Having Sealing System," herein incorporated by reference.

F. The Sealing System 4

Turning back to FIG. 3, the media pack 3 is shown installed in a housing 2. In the arrangement shown, air flows into the housing 2 at 306, through the media pack 3, and out of the housing 2 at 307. When media constructions such as the media pack 3 of the type shown are used in a duct or housing 2, sealing system 4 will be needed to ensure that air flows through the media pack 3, rather than bypass it.

The particular sealing system 4 depicted includes a frame construction 170 and a seal member 250. When this type of sealing system 4 is used, the frame construction 170 provides a support structure or backing against which the seal member 250 can be compressed to form a radial seal 172 with the housing 2.

Attention is further directed to FIGS. 2, 3 and 12. FIG. 2 is a schematic, perspective view of the sealing system 4; FIG. 3 is a schematic, cross-sectional view of the media pack 3 installed in the housing 2; and FIG. 12 is a schematic, end view of the sealing system 4 and the media pack 3.

In general, when using frame constructions 170 such as those described herein, the frame construction 170 will include a frame 205. The frame 205 may be a variety of shapes. In the particular embodiment illustrated in FIG. 3, the shape of the frame 205 is generally circular. The frame 205 depicted in FIG. 3 is convenient in that it is arranged and configured for attachment to the second flow face 110 (FIG. 2) of the filter construction 100.

In the particular arrangement depicted, the frame 205 has a band, skirt, or depending lip 251 that is generally circular and has an inside diameter. Preferably, the inside diameter is approximately equal to the outside diameter of the filter construction 100. The depending lip 251 depends or extends down a first distance from a bottom 252 surface of cross braces 210 (FIG. 12). The depending lip 251 is arranged and configured to extend radially around the second flow face 110 the filter construction 100. In the particular embodiment depicted, the depending lip 251 extends radially around the second flow face 110 of the filter construction 100, such that the depending lip 251 extends inboard the first distance of the second flow face 110 of the filter construction 100, defining an overlap region 255.

The frame 205 is preferably secured to the filter construction 100. A variety of ways to secure the frame 205 to the filter construction 100 are possible. One particularly preferred way to secure the frame 205 to the filter construction 100 is by use of an adhesive. In the particular embodiment depicted in FIG. 3, the adhesive is oriented in the overlap region 255 between the depending lip 251 and the filter construction 100.

Preferably, the adhesive permanently affixes the frame 205 to the filter construction 100 while preventing the fluid from leaking out through the overlap region 255 between the filter construction 100 and the frame 205. In alternative embodiments, the frame 205 may be temporarily attached to the filter construction 100. By the term "temporarily," it is meant that the frame 205 may be removed from the filter construction 100 without damaging either the sealing system 4 or the filter construction 100.

Referring to FIG. 12, during use of frames 205 of the type depicted herein, inward forces are exerted around the circumference of the frame 205. Cross braces 210 support the frame 205. By the term "support," it is meant that the cross braces 210 prevent the frame 205 from radially collapsing under the forces exerted around the circumference of the frame 205.

Referring again to FIG. 3, the particular frame construction 205 depicted preferably includes a tip portion 263, or annular sealing support. In the one depicted in FIG. 3, the tip portion 263 is generally circular and is arranged and configured for insertion into the housing 2. When circular, the tip portion 263 defines an inside diameter. Between the tip portion 263 and the depending lip 251, the frame 205 includes a step 253. The step 253 provides a transition area between the larger inside diameter of the depending lip 251 and the smaller inside diameter of the tip portion 263.

When constructed according to the arrangement shown in FIG. 3, the tip portion 263 provides support for the compressible seal member 250. The compressible seal member 250 is preferably constructed and arranged to be sufficiently compressible to be compressed between the tip portion 263 of the frame 205 and a sidewall 260 of the housing 2. When sufficiently compressed between the tip portion 263 and the sidewall 260, a radial seal 172 is formed between the media pack 3 and the sidewall 260 of the housing 2.

A variety of ways are possible to secure the seal member 250 to the tip portion 263. One particularly convenient and preferred way is by molding the seal member 250 to engage, cover, or overlap both the outer radial side 271 of the tip portion 263 and the inner radial side 270 of the tip portion 263, including the end tip 180. One particular embodiment of this configuration is depicted in FIG. 3. The seal member 250 completely covers the tip portion 263.

The tip portion 263 of the frame 205 defines a wall or support structure between and against which the radial seal 172 may be formed by the compressible seal member 250. The compression of the compressible seal member 250 at the sealing system 4 is preferably sufficient to form a radial seal under insertion pressures of no greater than 80 pounds, typically, no greater than 50 pounds, for example, about 20–30 pounds, and light enough to permit convenient and easy change out by hand. Preferably, the amount of compression of the compressible seal member 250 is at least fifteen percent, preferably no greater than forty percent, and typically between twenty and thirty-three percent. By the term "amount of compression," it is meant the physical displacement of an outermost portion of the seal member 250 radially toward the tip portion 263 as a percentage of the outermost portion of the seal member 250 in a resting, undisturbed state and not installed within a duct or subject to other forces.

Figure 5:
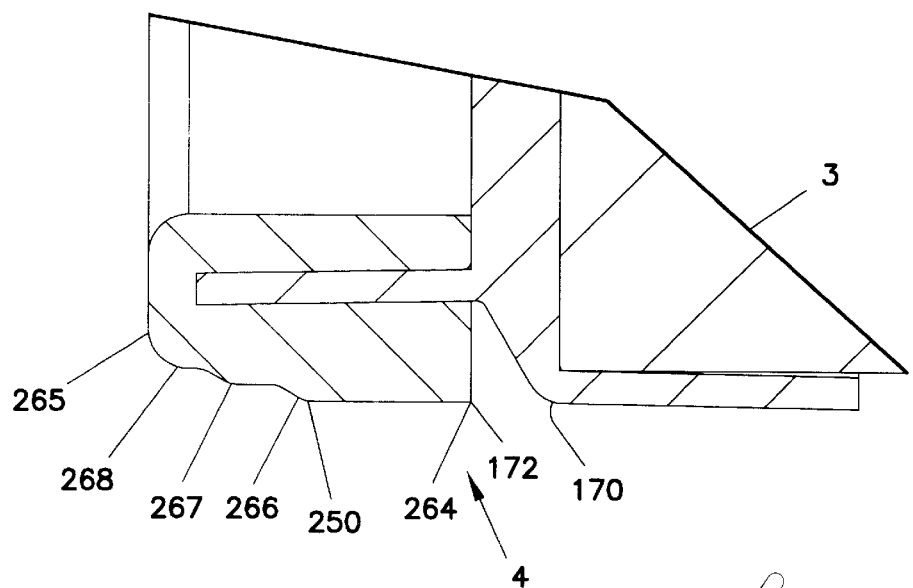
FIG. 5 is an enlarged, fragmented, schematic cross-sectional view of one embodiment a compressible seal member utilized to form a seal between a media pack and the air cleaner housing of FIG. 1.

Attention is directed to FIG. 5. FIG. 5 is an enlarged schematic, fragmented view of a particular preferred seal member 250 in an uncompressed state. In the preferred embodiment shown, the seal member 250 has a stepped cross-sectional configuration of decreasing outermost dimensions (diameter, when circular) from a first end 264 to a second end 265, to achieve desirable sealing. Preferred specifications for the profile of the particular arrangement shown in FIG. 5 are as follows: a polyurethane foam material having a plurality of (preferably at least three) progressively larger steps configured to interface with the sidewall 260 (FIG. 3) and provide a fluid-tight seal.

The compressible seal member 250 defines a gradient of increasing internal diameters of surfaces for interfacing with the sidewall 260. Specifically, in the example shown in FIG. 5, the compressible seal member 250 defines three steps 266, 267, 268. The cross-sectional dimension or width of the steps 266, 267, 268 increases the further the step 266, 267, 268 is from the second end 265 of the compressible seal member 250. The smaller diameter at the second end 265 allows for easy insertion into a duct or housing, such as the housing 2 of FIG. 3. The larger diameter at the first end 264 ensures a tight seal.

In general, for a properly functioning radially sealing structure, the compressible seal member 250 needs to be compressed when the element is mounted in the housing 2 (FIG. 3). In many preferred constructions, it is compressed between about fifteen percent and forty percent (often about twenty to thirty-three percent) of its thickness, in the thickest portion, to provide for a strong robust seal, yet still be one that can result from hand installation of the element with forces on the order of 80 pounds or less, preferably 50 pounds or less, and generally 20–30 pounds.

Referring back to FIG. 3, in general, the media pack 3 and sealing system 4 can be arranged and configured to be press-fit against the sidewall 260 of the housing 2 or duct. In the specific embodiment shown in FIG. 3, the compressible seal member 250 is compressed between the sidewall 260 and the tip portion 263 of the frame 205. After compression, the compressible seal member 250 exerts a force against the sidewall 260 as the compressible seal member 250 tries to expand outwardly to its natural state, forming the radial seal 172 between and against the tip portion 263 and the sidewall 260.

Referring back to FIG. 12, in the particular embodiment illustrated, the media pack 3 also includes a retention system 280 for retaining the secondary element 6 (FIG. 3) within the secondary element chamber 22 (FIG. 3). Stated in other words, the retention system 280 prevents the secondary element from axially slipping out of the secondary element chamber 22 within the housing 2 (FIG. 3).

In the particular embodiment illustrated in FIG. 12, the retention system 280 includes first, second, and third retention extensions 281, 282, 283. Preferably, the retention extensions 281, 282, 283 are integral with the compressible seal member 250 of the sealing system 4. Typically, the retention extensions 281, 282, 283 radially extend toward the center of the media pack 3 as illustrated. While a variety of configurations are contemplated, the particular embodiment illustrated shows the retention extensions 281, 282, 283 as having a semi-oval or quarter-moon cross-sectional shape.

Referring to FIG. 3, the retention extensions 281, 282, 283 (FIG. 12) are configured and arranged to touchably engage the secondary element 6 within the housing 2. Specifically, the second retention extension 282 is illustrated in FIG. 3 radially extending toward the center of the media pack 3 overlapping with an outside edge 285 of a frame construction 402 of the secondary element 6. The second retention extension 282 extends in overlapping engagement with the outside edge 285 of the secondary element 6 such that there is axial abutment between the retention extension 282 and a frame of the secondary element 6. This ensures that the secondary element 6 is locked or secured within the secondary element chamber 22 and prevented from axially slipping within the housing 2. The first and third extensions 281, 283, likewise, touchably engage and axially abut the frame of the secondary element 6 to retain the secondary element 6 within the secondary element chamber 22. As such, the secondary element 6 will be trapped between the stop surface 87 and the first, second, and third retention extensions 281, 282, and 283.

In alternative embodiments, the retention extensions may be of other sizes or shapes, and the retention system 280 may include other numbers of retention extensions. The particular arrangement depicted is preferred in that it lends itself to convenient manufacturing techniques and is ornamental, eye-catching, and attractive.

G. The Secondary Element 6

Figure 10:
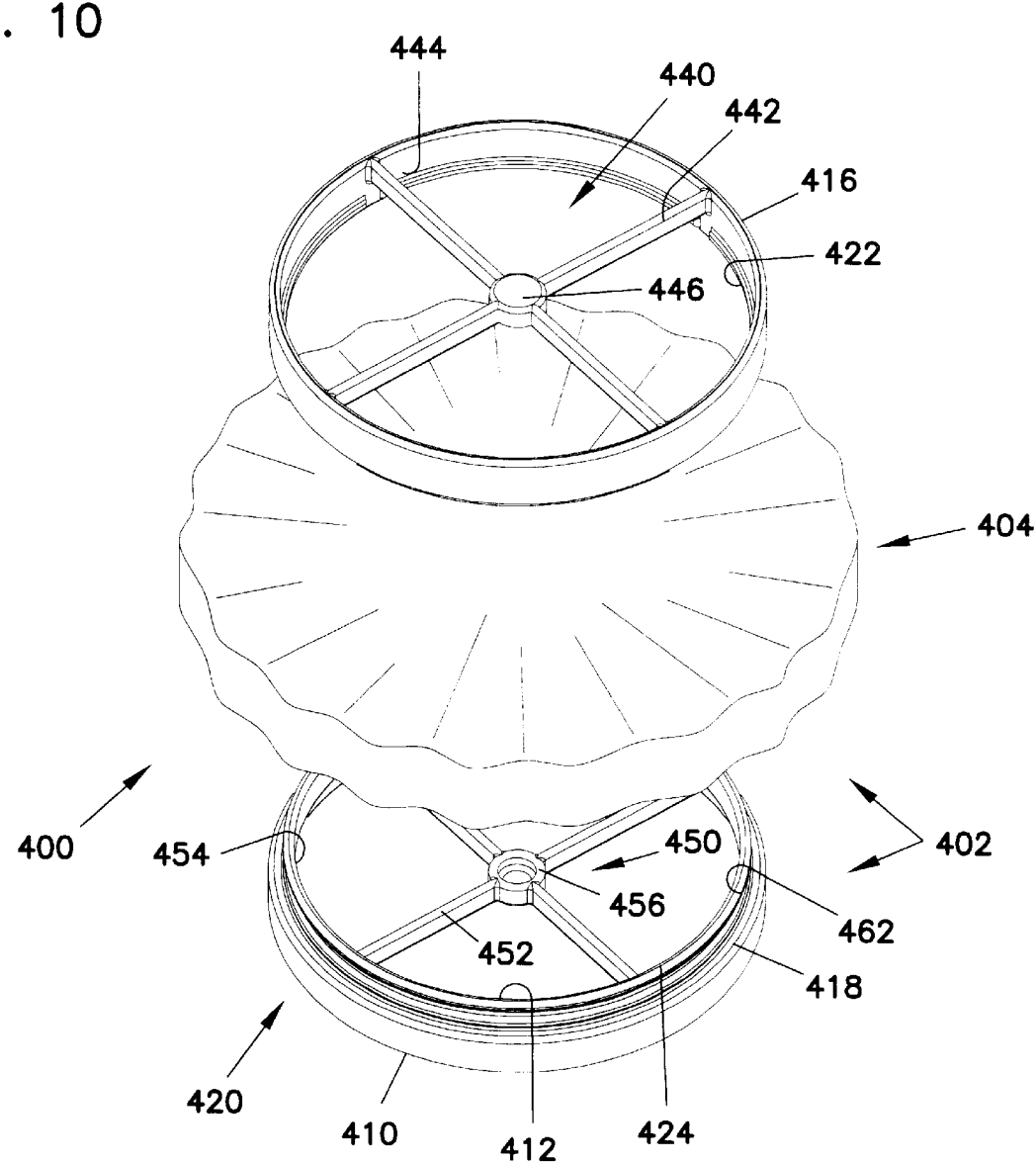
FIG. 10 is an exploded, perspective view of one embodiment of a secondary filter element usable in the air cleaner depicted in FIG. 1, according to the principles of the present disclosure.

Attention is directed to FIG. 10. FIG. 10 depicts an exploded, perspective view of the secondary element 6, shown in the air cleaner 1 of FIGS. 2 and 3.

In general, the secondary element 6 includes a frame construction 402 and a region of media 404. In preferred constructions, the frame construction 402 is usable for holding and supporting the region of media 404. Preferably, the media 404 is for removing at least some particulates from a gas stream (that is, particulates having a smallest outermost dimension that is larger than a largest pore size of the media 404). For example, the media 404 can be used to remove particulates from air being taken into an engine.

In preferred systems, the media 404 preferably is constructed and arranged to introduce little restriction into the air intake duct. For example, the secondary element 6 including the media 404, in some arrangements, will have a restriction of no more than two inches of water, preferably no more than one inch of water.

The region of media 404 within the periphery of the frame construction 402, in the embodiment depicted in FIG. 10, is nonpleated and noncylindrical. Further, in the particular FIG. 10 embodiment, the region of media 404 is nonwoven and comprises not more than a single layer. The particular type of media 404 depicted in FIG. 10 includes a region of depth media, such as fibrous media.

When media 404 of the type depicted in FIG. 10 is assembled in the frame construction 402 depicted in FIG. 10, the media 404 will include a filtering portion 406 and a skirted portion 408 as illustrated in FIG. 2. The filtering portion 406 will operate to remove contaminants and particulates having a size (i.e., smallest outermost dimension) greater than the pore size of the media 404 from an air or gas stream passing therethrough. For example, with certain types of media 404 described herein, the filtering portion 406 will remove about 50% of dust particles having an average particle size (smallest outermost dimension) of less than 1–10 microns passing therethrough.

The skirted portion 408 preferably operates to cooperate with an annular surface of a duct, such as the secondary element chamber interior wall 269 to occupy or fill a volume between the wall 269 and the secondary element 6 and create a "sealing effect." By the term "sealing effect," it is meant that high restriction is introduced in the volume between the periphery of the frame construction 402 and an inner wall portion 269 of the housing 2; while some air or gas may be allowed to pass through the region between an outer periphery of the frame construction 402 and the annular surface of the housing 2, the air or gas that does pass through, for the most part, will pass through the media in the skirted portion 408. This is described further below.

Still in reference to FIG. 10, the particular frame construction 402 depicted in FIG. 10 includes an outer periphery 410. The outer periphery 410 defines a perimeter area 412 therewithin. In other words, in the specific configuration depicted in FIG. 10, the perimeter area 412 comprises the entire region within the outer periphery 410. The outer periphery 410 may have a variety of shapes. In the particular embodiment shown in FIG. 10, the outer periphery 410 is circular. In the particular embodiment of FIG. 10, the perimeter area 412 would include everything within the circular periphery 410 and can be calculated by squaring the radius of the circular outer periphery 410 and multiplying it by pi ($\pi$).

When constructed in the way shown in FIG. 2, the filtering portion 406 occupies or fills the entire perimeter area 412 (FIG. 10). When cleaning a gas stream passing therethrough, by occupying the entire perimeter area 412, there are no regions of unfiltered areas that the gas stream may escape through. As can also be seen in FIG. 2, preferably the skirted portion 408 extends outside of the outer periphery 412 and is not part of the perimeter area 410. In the particular arrangement shown in FIG. 2, the skirted portion 408 extends both outside and radially projects from the outer periphery 412. In FIG. 2, it can be seen that the media 404 (FIG. 10) includes an outermost edge or periphery at 414. This outermost edge 414 is spaced from the outer periphery 412, when the secondary element 6 is not installed in a duct or tubular construction.

In some preferred constructions, the frame construction 402 is a multi-piece construction. In the particular arrangement depicted in FIG. 10, the frame construction 402 is a two-piece construction. In the particular FIG. 10 embodiment, the frame construction 402 includes first and second frame pieces 416, 418. The first and second frame pieces 416, 418 preferably are constructed and arranged to hold the media 404 within the housing 2, while providing sufficient structural integrity to prevent collapse under air pressure.

When a multi-piece frame construction 402 is used, there will include structure or a construction holding the multiple pieces together with the media 404. In the particular illustrated arrangement, the first and second frame pieces 416, 418 include a locking arrangement 420, constructed and arranged to permit the first and second pieces 416, 418 to lock, or fit, or snap, or matably engage together. In preferred arrangements, the locking construction or arrangement 420 holds the region of media 404 between the first and second frame pieces 416, 418 to securely hold the media 404 in place and under sufficient tension to minimize the restriction through the media 404.

A variety of locking arrangements 420 may be implemented. In the particular construction illustrated, the locking arrangement 420 includes a bead and recess system. That is, preferably, at least one of the first and second frame pieces 416, 418 has a projection, such as a bead, while the other of the first and second frame pieces 416, 418 has a cooperating recess or indent for receiving the bead. In the particular illustrated embodiment depicted in FIG. 10, the first frame piece 416 defines a recessed portion 422, while the second frame piece 418 defines a projection or bead member 424 for projecting or snapping therein.

In certain preferred arrangements, the frame construction 402 will include a handle system for permitting the convenient installation and removal of the secondary element 6 from the housing 2. Many different types of handle systems may be implemented. One particularly preferred embodiment of a handle system is illustrated in FIG. 10. In the particular FIG. 10 embodiment, the first frame piece 416 includes a first handle construction 440. While a variety of constructions are contemplated herein, in the embodiment shown in FIG. 10, the first handle construction 440 includes a plurality of ribs 442 radially extending from the first region 444 of the first frame piece 416. In the embodiment shown, the ribs 442 intersect at a center frame member 446. The ribs 442 and center frame member 446 provide structure for a user to grasp when handling the secondary element 6, for example when changing out the secondary element 6.

In certain preferred constructions, the first handle construction 440 including the ribs 442 and center frame member 446 also provide support structure to the frame construction 402. Again, the frame construction 402 should have sufficient structural integrity to prevent collapse under air intake pressures, that can typically range from at least 25 in. of water, and can be up to 100 inches of water. In addition, the first handle construction 440 helps to maintain sufficient tension in the media 404 to minimize the restriction through the media 404.

Likewise, the second frame piece 418 includes a second handle construction 450. While a variety of constructions are contemplated herein, in the embodiment shown in FIG. 10, the second handle construction 450 includes a plurality of ribs 452 radially extending from a second region 454 of the first frame piece 418. In the embodiment shown, the ribs 452 intersect at a center frame member 456. The ribs 452 and center frame member 456 provide structure for a user to grasp when handling the secondary element 6.

In certain preferred constructions, the second handle construction 450 including the ribs 452 and center frame member 456 also provide support structure to the frame construction 402. Again, the frame construction 402 should have sufficient structural integrity to prevent collapse under air intake pressures, that can typically range from at least 25 in. of water, and can be up to 100 inches of water. In addition, the second handle construction 450 helps to maintain sufficient tension in the media 404 to minimize the restriction through the media 404.

Alternatively, additional structure may be attached to the frame construction 402 to allow for the convenient installation and removal of the secondary element 6 from the housing 2. Because both the first and second frame pieces 416, 418 include handle constructions 440, 450, the secondary element 6 is reversible. By the term "reversible," it is meant that the secondary element 6 may be installed in the housing 2 with either the first frame piece 416 or the second frame piece 418 in the most upstream position (alternatively stated, the first frame piece 416 or the second frame piece 418 may be installed in the most downstream position). The media construction 404 will deflect in the proper orientation and occupy to fill the space between the periphery of the frame construction 402 and the wall 269, when the secondary element 6 is inserted.

Attention is directed to FIG. 3. In FIG. 3, the secondary element 6 is depicted installed in the housing 2. The skirt 408 fills the volume between the inner wall 269 of the housing 2 and the frame construction 402. As can be seen in FIG. 3, the skirted portion 408 of the media 404 is preferably constructed and arranged to be sufficiently compressible to be compressed between the frame construction 402 and the inner wall 269 of the housing 2. When sufficiently compressed between the frame construction 402 and inner wall 269, sealing effect 460, or media-stuffed volume or media-filled region, is formed for the secondary element 6 with the housing 2. Specifically, the sealing effect 460 is formed between the secondary element 6 and the inner wall 269. In the particular embodiment shown in FIG. 3, the sealing effect 460 is formed by compressing the skirted portion 408 of the media 404 between and against the frame construction 402 and the inner wall 269.

The compression of the media 404 at the skirted portion 408, in preferred systems, will be preferably sufficient to form the sealing effect 460 under pressures of up to 100 in. of water, and light enough to permit convenient and easy change out by hand. Preferably, the compression of the skirted portion 408 to form the media-occupied volume or region is at least 70%, preferably no greater than 90%, and typically between 75–85%. In preferred systems, the sealing effect 460 can be created by applying typically under 5 pounds of force, and ranging between 1–20 pounds.

One usable secondary element is described in commonly assigned and co-pending U.S. patent application, Ser. No. 09/258,447 pending, entitled, "Filter Element and Methods," filed on the same date herewith, and herein incorporated by reference.

H. Indicator System 5

Referring back to FIG. 1, in the particular embodiment illustrated, the air cleaner assembly 1 includes the restriction indicator 5 for providing an indication to an user of the air cleaner assembly 1 of the restriction across the media pack 3 of the air cleaner assembly 1. The restriction indicator 5 is designed to provide the user with an indication of when the media pack 3 needs to serviced or replaced.

Referring to FIG. 2, in general, the restriction indicator 5 includes an outlet extension 800, an indicator tube 801, and an indicator 802. Referring to FIG. 3, the outlet extension 800 extends from the outlet exterior wall 18 of the housing 2 and defines an indicator chamber 803. Preferably, the indicator chamber 803 is in communication with the outlet chamber 23 such that air moves through the indicator chamber 803. Typically, the outlet extension 800 is integral with the outlet exterior wall 18 of the housing 2.

In the particular embodiment illustrated, the indicator tube 801 connects the outlet extension 800 with the indicator 802. Preferably, the indicator tube 801 is in communication with the outlet extension 800 such that air passes through the indicator tube 801 therethrough to the indicator 802. Preferably, the indicator tube 801 is connected to the outlet extension 800 and the indicator 802 by conventional securing means, such as screwing the indicator tube 801 onto the outlet extension 800.

Preferably, the indicator 802 measures the air pressure across the outlet chamber 23. When the air pressure reaches a predetermined level, for example 25 inches of water, the indicator 802 provides an indication to the user of the air cleaner assembly 1 that the media pack 3 needs servicing or replacement.

One such usable restriction indicator device 5 is described in commonly assigned U.S. Pat. No. 3,443,365, herein incorporated by reference.

In alternative embodiments, the air cleaner assembly 1 does not include a restriction indicator. In these embodiments, the user services or replaces the media pack 3 after a predetermined number of hours of use, for example 150 hours, or by visual inspection of the media pack 3. In other alternative embodiments, the media pack 3 may have color, such as blue, to help the user determine the level of occlusion in the media pack 3.

I. Change Out and Replacement

In certain preferred applications, the media packs described herein are removable and replaceable from whatever system in which they are installed. For example, the media pack will be installed in an air cleaner housing, such as the one shown in FIGS. 1–3. After a certain number of hours of use, the media in the filter construction 100 will become occluded, and the restriction in the media pack 3 will increase. In preferred applications, the media pack 3 will be periodically replaced to maintain the appropriate removal of particulates from a fluid, without introducing too high of a restriction.

In applications where the restriction indicator 5 is used, the restriction indicator 5 will provide information to the user regarding the appropriate time to change out the media pack 3.

To service the air cleaner arrangements described herein, the user will need access to the media pack 3. For example, if the media pack 3 is installed in an air cleaner housing such as the housing 2 shown in FIGS. 1–3, the user will unlatch the cover 13 from the body member 12, and remove the cover 13 from the body member 12. This will expose an opening 80 (FIG. 9) defined by the body member 12. The user will grasp the media pack 3 and break the radial seal 172 formed by the media pack 3 against the sidewall 16 of the housing 2. In certain systems, the seal member 250 and the housing 2 will be designed such that the user will need to exert a force of no more than about 80 pounds, preferably no more than 50 pounds, and in some applications between 20 and 30 pounds to break the radial seal 172 and remove the media pack 3. The user will then pull the media pack 3 through the opening 80 formed by the body member 12. The old media pack 3 may then be disposed of. In certain preferred systems, the media pack 3 will be constructed of non-metallic materials, such that it is readily incineratable. For example, in some preferred constructions, the media pack 3 will comprise at least 95 percent, and typically at least 98 percent nonmetallic materials.

When the media pack 3 is being serviced, sometimes debris and particulate materials can be knocked or jarred from the media pack 3 and fall into the housing 2. The secondary element 6 operates to catch this debris and contaminant and prevent these contaminants from being sucked into the engine.

After the media pack 3 has been removed, the secondary element 6 may be serviced. It is contemplated that the secondary element 6 may not need servicing every time the media pack 3 is serviced. When it is desired to service the secondary element 6, the user removes the secondary element 6 from the housing 2 by breaking the sealing effect 460 formed by the media 404. More specifically, the user grasps the handle construction 440 of the frame construction 402 and removes the secondary element 6 from the housing 2. This may be done by grasping the ribs 442 and center framework 446 and axially pulling the element 6 from the housing 2 by sliding it along the interior wall 269 of the secondary element chamber 22 of the housing 2. As the secondary element 6 is being slid along the wall 269 of the housing 2, the skirted portion 408 of the media 404 wipes the wall 269 to help clean the housing 2.

After the secondary element 6 is removed from the housing 2, either the entire secondary element 6 can be disposed of and replaced with a new one, or alternatively, only the media 404 is disposed of while the frame construction 402 is reused. Preferably, the secondary element 6 is constructed of substantially metal free materials such that it is readily incineratable. For example, preferably the secondary element 6 comprises at least 95%, and more preferably 98–100% nonmetallic materials. If the entire secondary element 6 is disposed of, the old secondary element 6 can be incinerated.

Alternatively, the secondary element 6 can be disassembled and the media 404 removed. The old filter media 404 would be disposed of, such as by incineration. The frame construction 402 could be recycled, or alternatively, re-used. If re-used, a new region of filter media 404 would be secured to the frame construction 402. For example, when disassembling the secondary element 6, the first and second frame pieces 416, 418 are removed or unlocked or unsnapped from each other. A screwdriver or other suitable tool may be used to pry the first frame piece 416 from the second frame piece 418. By unlocking the first and second frame pieces 416, 418 from each other, this frees the first, old filter media 404, which may then be incinerated. The secondary element 6 is then reassembled. This may be done by placing a new region of media over the end portion 462 of the second frame piece 418. The skirted portion 408 of the media should be extending outwardly from the second frame piece 418. The first frame piece 416 can then be aligned with the second frame piece 418 and snapped or locked to the second frame piece 418.

The new secondary element 6 can then be installed in the housing 2. This may be done by grasping the frame construction, such as the ribs 442 (FIG. 10) of the handle construction 440 (FIG. 10) and inserting it into the housing 2. The secondary element 6 is inserted until the frame construction 402 axially engages or abuts the stop surface 87. The skirted portion 408 (FIG. 2) of the filter element becomes compressed between and against the frame construction 402 and the inner wall 269 of the housing 2 to occupy or fill the volume therebetween and create a media-filled region 460 and a sealing effect.

After the secondary element 6 is replaced, the media pack 3 may also then be replaced within the housing 2.

To install a new media pack 3, the user grasps the media pack 3 and inserts it through an opening in the housing 2. The media pack 3 is inserted into the opening until the retention extensions 280, 281, 283 of the retention system 280 touchably engage the secondary element 6 and until the seal member 250 is sufficiently compressed against the annular wall 16 of the housing 2 to form radial seal 172 between and against the housing wall 16 and the tip portion 263 of the frame 205. The end tip 86 of the seal member 250 will usually axially abut the stop surface 85 of the seat 84, when properly installed. The cover 13 is then oriented over the exposed end of the media pack 3 to cover the opening 80. The cover 13 is then latched to the body member 12 by the latches 42, 43.

J. Example Materials

In this section, examples are provided of usable materials. The particular choice for any given material will vary, depending on the filtering application. In other words, the particular material selected for the systems usable herein will be decided upon by the system designer based on the system requirements. A variety of materials are possible. The following section provides examples of materials that have been found to be suitable.

The housing 2 can be constructed of plastic, such as glass-filled nylon.

The media 122 can comprise cellulose. One example of media usable in the system described above is as follows: cellulose media with the following properties: a basis weight of about 45–55 lbs./3000 ft$^2$ (84.7 g/m$^2$), for example, 48–54 lbs./3000 ft$^2$; a thickness of about 0.005–0.015 in, for example about 0.010 in. (0.25 mm); frazier permeability of about 20–25 ft/min, for example, about 22 ft/min (6.7 m/min); pore size of about 55–65 microns, for example, about 62 microns; wet tensile strength of at least about 7 lbs/in, for example, 8.5 lbs./in (3.9 kg/in); burst strength wet off of the machine of about 15–25 psi, for example, about 23 psi (159 kPa).

The cellulose media can be treated with fine fiber, for example, fibers having a size (fiber diameter) of 5 microns or less, and in some instances, submicron. A variety of methods can be utilized for application of the fine fiber to the media. Some such approaches are characterized, for example, in U.S. Pat. No. 5,423,892, column 32, at lines 48–60. More specifically, such methods are described in U.S. Pat. Nos. 3,878,014; 3,676,242; 3,841,953; and 3,849,241, incorporated herein by reference. Another alternative is a trade secret approach comprising a fine polymeric fiber web positioned over conventional media, practiced under trade secret by Donaldson Company under the designation ULTRA-WEB®. With respect to the configurations of the filter element, the operation of the sealing system, and the construction and operation of the housing and resonator, there is no particular preference for: how the fine fibers are made; and, what particular method is used to apply the fine fibers. Enough fine fiber would be applied until the resulting media construction would have the following properties: initial efficiency of 99.5% average, with no individual test below 90%, tested according to SAE J726C, using SAE fine dust; and an overall efficiency of 99.98% average, according to SAE J726C.

The frame 205 (FIG. 3) of the sealing system 4 will be constructed of a material that will provide structural integrity and is not subject to creep. The frame 205 will be constructed of a non-metallic material such that it is environmentally friendly and either recyclable or readily incineratable. The frame 205 can be constructed from most plastics, for example, glass reinforced plastic. One usable reinforced plastic is propylene or nylon. Of course, other suitable materials may be used.

The compressible seal member 250 (FIG. 5) can be made from a variety of materials. There is no particular preference, provided that the seal member 250 forms a seal in the proper location under compression. One usable material will be a soft polymeric material, such as foamed urethane. One example usable material includes foamed polyurethane, processed to an end product having an "as molded" density of fourteen to twenty-two pounds per cubic foot. Foamed polyurethanes are available from a variety of sources, such as BASF Corporation of Wyandotte, Mich. One example of a foamed polyurethane comprises a material made with I35453R resin and I305OU isocyanate, which is sold exclusively to the assignee Donaldson by BASF Corporation.

The materials should be mixed in a mix ratio of 100 parts I35453 resin to 36.2 parts I305OU isocyanate (by weight). The specific gravity of the resin is 1.04 (8.7 pounds/gallon), and for the isocyanate it is 1.20 (10 pounds/gallon). The materials are typically mixed with a high dynamic shear mixer. The component temperatures should be seventy to ninety-five degrees Fahrenheit. The mold temperatures should be 115–135° Fahrenheit.

The resin material I35453R has the following description:
(a) Average molecular weight
1) Base polyether polyol=500–15,000
2) Diols=60–10,000
3) Triols=500–15,000
(b) Average functionality
1) total system=1.5–3.2
(c) Hydroxyl number
1) total systems=100–300
(d) Catalysts
1) amine=Air Products 0.1–3.0 PPH
2) tin=Witco 0.01–0.5 PPH
(e) Surfactants
1) total system=0.1–2.0 PPH
(f) Water
1) total system=0.03–3.0 PPH
(g) Pigments/dyes
1) total system=1–5% carbon black
(h) Blowing agent
1) 0.1–6.0% HFC 134A.

The I305OU isocyanate description is as follows:
(a) NCO content—22.4–23.4 wt %
(b) Viscosity, cps at 25° C.=600–800
(c) Density=1.21 g/cm³ at 25° C.
(d) Initial boiling pt.—190° C. at 5 mm Hg
(e) Vapor pressure=0.0002 Hg at 25° C.
(f) Appearance—colorless liquid
(g) Flash point (Densky-Martins closed cup)=200° C.

The frame construction 402 (FIG. 10) of the secondary element 6 will be constructed of a material that will provide structural integrity and is not subject to creep. Further, the frame construction 402 can be constructed of a non-metallic material such that it is environmentally friendly and either recyclable or readily incineratable. The frame construction can be constructed from most plastics, for example, glass reinforced plastic. One usable reinforced plastic is propylene or nylon.

The media 404 (FIG. 10) for the secondary element 6 will be a media that will introduce little restriction into the duct. The media can be a nonpleated, noncylindrical, nonwoven media. In particular, the media can be depth media, such as a fibrous media. One example of fibrous media usable in the system described above is as follows:

1 layer of 4.0–4.8 oz/yd² (136–163 g/m²) polyester fiber depth media (mixed fibers); 0.55–0.70" (14–18 mm) thickness freestate (as measured under 0.002 psi compression); average fiber diameter about 21.0 micron (mass weighted average) or about 16.3 micron (length weighted average); permeability (minimum) 500 ft/min (152 m/min.); free state solidity about 0.6–1.0%, typically about 0.7%.

K. Example Construction

In this section, examples are provided of a set of operating specifications. These are intended as an example. A wide variety of alternate sizes can be used.

The first diameter D1 of the first media chamber 20 of FIG. 9 will be between 3 inches (about 8 cm) and 6 inches (about 15 cm), and in one example would be approximately 4.1 inches (about 10 cm). The first axial length L1 of the first media chamber 20 will be between 2 inches (about 5 cm) and 5 inches (about 13 cm), and in one example would be approximate 3.7 inches (about 9 cm).

The second diameter D2 of the sealing chamber 21 of FIG. 9 will be between 2 inches (about 5 cm) and 5 inches (about 13 cm), and in one example would be approximately 3.7 inches (about 9 cm). The second axial length L2 of the sealing chamber 21 will be between 0.5 inches (about 1 cm) and 2 inches (about 5 cm), and in one example would be approximately 0.8 inches (2 cm).

The third diameter D3 of the secondary element chamber 22 of FIG. 9 will be between 1.5 inches (about 4 cm) and 4.5 inches (about 11 cm), and in one example would be approximately 2.7 inches (about 7 cm). The third axial length L3 of the secondary element chamber 22 will be between 0.4 inches (1 cm) and 1.5 inches (about 4 cm), and in one example would be approximately 0.6 inches (1.5 cm).

The fourth diameter D4 of the outlet 23 of FIG. 9 will be between 1 inch and 3 inches, and in one example would be approximately 1.5 inches (about 4 cm). The fourth axial length L4 of the outlet 23 will be between 1 inch (2.5 cm) and 4 inches (about 10 cm), and in one example would be approximately 2.1 inches (about 5 cm).

The fifth diameter D5 of the body chamber 30 of FIG. 7 will be between 3 inches (about 8 cm) and 6 inches (about 15 cm), and in one example would be approximately 4.3 inches (about 11 cm). The fifth axial length L5 of the body chamber 30 will be between 0.2 inches (0.5 cm) and 1 inch (2.5 cm), and in one example would be approximately 0.3 inches (about 1 cm).

The sixth diameter D6 of the second media chamber 31 of FIG. 7 will be between 3 inches (about 8 cm) and 6 inches (about 15 cm), and in one example would be approximately 4.1 inches (about 10 cm). The sixth axial length L6 of the second media chamber 31 will be between 1 inch (2.5 cm) and 4 inches (about 10 cm), and in one example would be approximately 2.2 inches (about 6 cm).

The seventh axial length L7 of the overall media pack chamber 67 of FIG. 3 will be between 5 inches (about 13 cm) and 10 inches (about 25 cm), and in one example would be approximately 7.1 inches (18 cm).

The eighth axial length L8 of the gap 106 of FIG. 3 will be between 0.1 inches (about 0.5 cm) and 0.5 inches (about 1 cm), and in one example would be approximately 0.2 inches (0.5 cm).

The first distance K1 of the support structure 35 of FIG. 7 will be between 0.5 inches (about 1 cm) and 1.5 inches (about 4 cm), and in one example would be approximately 0.8 inches (2 cm).

The filter construction 100 of FIG. 3 will provide at least 250 sq. in and typically 400–500 sq. in., for example about 450–460 sq. in. of media surface area. It will occupy a volume of no greater than about 200 in$^3$, and typically between 50–100 in$^3$, and for example about 65–75 in$^3$.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An air cleaner arrangement comprising:
   (a) a housing having first and second opposite ends and defining an interior volume; said housing defining an inlet adjacent to said first end and an outlet adjacent to said second end;
      (i) said housing including an internal annular sealing surface;
      (ii) said housing including a first seat being angled relative to said annular sealing surface;
   (b) a media pack oriented within said interior volume of said housing;
      (i) said media pack having a first flow face and an opposite second flow face; said first flow face being adjacent to said first end, and said second flow face being adjacent to said second end;
         (A) said media pack being constructed and arranged for air to flow into said media pack through said first flow face, and for air to exit said media pack through said second flow face;
   (c) a seal member forming a seal between said media pack and said housing;
      (i) said seal member being supported by an extension of a frame arrangement;
         (A) said extension projecting axially from one of said first and second flow faces;
      (ii) said seal member forming a radial seal between and against said extension and said housing;
         (A) said first seat engaging said seal member;
      (iii) said seal member being circumscribed by said sealing surface; said radial seal being formed by compression of said seal member between and against said sealing surface and said extension of said frame arrangement; and
   (d) a secondary filter element oriented within said interior volume of said housing.

2. An air cleaner arrangement according to claim 1 wherein:
   (a) said secondary filter element is oriented between said seal member and said outlet.

3. An air cleaner according to claim 1 wherein:
   (a) said housing includes a cup and a body member; one of said cup and said body member having an alignment protrusion, and one of said cup and said body member having a channel in receipt of said protrusion.

4. An air cleaner according to claim 3 further including:
   (a) at least one latch member for selectively securing together said cup and said body member.

5. An air cleaner according to claim 1 wherein:
   (a) said media pack comprises a plurality of flutes; each of said flutes having an upstream portion adjacent to said first flow face and a downstream portion adjacent to said second flow face;
      (i) selected ones of said flutes being open at said upstream portion and closed at said downstream portion; and selected ones of said flutes being closed at said upstream portion and open at said downstream portion.

6. An air cleaner according to claim 1 wherein:
   (a) said extension includes an end tip; an outer radial surface, and an opposite inner radial surface; and
   (b) said seal member includes a first portion being oriented against at least said outer radial surface of said extension.

7. An air cleaner according to claim 6 wherein:
   (a) said seal member includes a second portion oriented against said end tip; and a third portion oriented against said inner radial surface.

8. An air cleaner according to claim 7 wherein:
   (a) said second portion of said seal member is oriented between said end tip and said first seat.

9. An air cleaner according to claim 8 wherein:
   (a) said third portion of said seal member includes a plurality of projections extending therefrom;
      (i) said projections engaging said secondary filter element.

10. An air cleaner according to claim 9 wherein:
    (a) said housing includes a second seat for engaging said secondary filter element;
       (i) said secondary filter element being between and against said second seat and said projections.

11. An air cleaner comprising:
    (a) a housing having an inlet, an outlet, and a wall extending between said inlet and said outlet; said inlet and outlet being at opposite ends of said housing; said wall defining a housing interior portion;
       (i) said housing having an annular seat constructed and arranged to support a filter element;
       (ii) said inlet comprising a first open area defined by said housing;
       (iii) said outlet comprising a second open area defined by said housing;
          (A) said first open area being about 5–10 percent smaller than said second open area;
       (iv) said wall being cylindrical and having a diameter about 100–250 percent larger than a largest cross-sectional dimension of said outlet;

(v) said wall having a length extending between said inlet and said annular seat; a ratio of said wall length to said diameter of said wall being at least about 1.5;

(b) a filter element oriented within said housing interior portion against said annular seat;

(c) a seal member forming a seal between said filter element and said housing; and (d) a non-internal tube construction within said housing interior portion between said filter element and said outlet.

12. An air cleaner according to claim 11 wherein:

(a) said filter element comprises a cylindrical construction with a first flow face, and an opposite second flow face; said filter element being constructed and arranged to permit the flow of air into the filter element through the first flow face and exit the filter element through the second flow face;

(i) said filter element having a plurality of flutes; each of said flutes having an upstream portion adjacent to said first flow face and a downstream portion adjacent to said second flow face;

(ii) selected ones of said flutes being open at said upstream portion and closed at said downstream portion; and selected ones of said flutes being closed at said upstream portion and open at said downstream portion; and (b) said seal member is supported by an extension of a frame arrangement;

(i) said extension projecting axially from one of said first and second flow faces;

(ii) said seal member forming a radial seal between and against said extension and said wall.

13. An air cleaner according to claim 12 further including:

(a) a secondary filter element oriented in said housing interior between said seal member and said outlet;

(i) said secondary filter element including a region of filter media and a frame construction holding said region of filter media;

(A) said region of filter media having a skirted portion; said skirted portion being positioned between said wall and said frame construction.

14. An air cleaner according to claim 13 wherein:

(a) said housing includes a cover and a body member; said cover defining said housing inlet;

(i) said inlet comprises a plurality of slots defined by said cover;

(A) each of said slots having first and second ends; each of said first ends being adjacent to an outer periphery of said cover; each of said second ends being adjacent to a center of said cover;

(B) each of said slots being tapered in width from said first end to said second end.

15. An air cleaner arrangement comprising:

(a) a housing having first and second opposite ends and defining an interior volume; said housing defining an inlet adjacent to said first end and an outlet adjacent to said second end;

(b) a primary filter element oriented within said interior volume of said housing;

(c) a seal member forming a seal between said primary filter element and said housing;

(d) a secondary filter element oriented within said interior volume of said housing;

(i) said secondary filter element being oriented between said seal member and said outlet; and (ii) said seal member engaging a portion of said secondary filter element.

16. An air cleaner arrangement according to claim 15 wherein:

(a) said secondary filter element includes a frame construction;

(b) said seal member comprises a circular gasket having opposite outer and inner radial sides;

(i) said seal member having a plurality of projections extending from said inner radial side;

(ii) said projections axially abutting said frame construction.

17. An air cleaner arrangement according to claim 16 wherein:

(a) said housing defines a first seat constructed and arranged to support said seal member; and a second seat constructed and arranged to support said secondary filter element;

(i) said secondary filter element being between and against said second seat and said projections.

18. An air cleaner arrangement comprising:

(a) a housing having first and second opposite ends and defining an interior volume; said housing defining an inlet adjacent to said first end and an outlet adjacent to said second end;

(i) said housing including an internal annular sealing surface;

(ii) said housing including a first seat being angled relative to said annular sealing surface;

(b) a media pack oriented within said interior volume of said housing;

(i) said media pack having a first flow face and an opposite second flow face; said first flow face being adjacent to said first end, and said second flow face being adjacent to said second end;

(A) said media pack being constructed and arranged for air to flow into said media pack through said first flow face, and for air to exit said media pack through said second flow face;

(c) a seal member forming a seal between said media pack and said housing;

(i) said first seat engaging said seal member;

(d) a secondary filter element oriented within said interior volume of said housing.

19. An air cleaner arrangement according to claim 18 wherein:

(a) said secondary filter element is oriented between said seal member and said outlet.

20. An air cleaner according to claim 18 wherein:

(a) said housing includes a cup and a body member; one of said cup and said body member having an alignment protrusion, and one of said cup and said body member having a channel in receipt of said protrusion.

21. An air cleaner according to claim 18 wherein:

(a) said media pack comprises a plurality of flutes; each of said flutes having an upstream portion adjacent to said first flow face and a downstream portion adjacent to said second flow face;

(i) selected ones of said flutes being open at said upstream portion and closed at said downstream portion; and selected ones of said flutes being closed at said upstream portion and open at said downstream portion.

22. An air cleaner according to claim 21 wherein:

(a) said seal member is supported by an extension of a frame arrangement;

(i) said extension projecting axially from one of said first and second flow faces;
(ii) said seal member forming a radial seal between and against said extension and said housing.

23. An air cleaner according to claim 22 wherein:
(a) said seal member is circumscribed by said sealing surface; said radial seal being formed by compression of said seal member between and against said sealing surface and said extension of said frame arrangement.

24. An air cleaner according to claim 23 wherein:
(a) said housing includes a second seat for engaging said secondary filter element.

25. An air cleaner according to claim 23 wherein:
(a) said first seat is angled between 60°–120° relative to said sealing surface.

26. An air cleaner according to claim 23 wherein:
(a) said first seat is angled between 70°–110° relative to said sealing surface.

27. An air cleaner according to claim 18 wherein:
(a) said seal member includes an end axial surface; and
(b) said first seat is axially engaged by said end axial surface of said seal member.

* * * * *